US006623294B2

(12) United States Patent
Tse et al.

(10) Patent No.: US 6,623,294 B2
(45) Date of Patent: Sep. 23, 2003

(54) ADAPTER WITH MANUALLY RETRACTABLE CABLE ASSEMBLY AND ELECTRICAL PLUG ASSEMBLY

(75) Inventors: Man Keung Tse, Tsuen Wan (HK); John M. Groves, Kowloon (HK); Wing Ling Cheng, Taipo (HK); Neal G. Stewart, Tsuen Wan (HK); Steven Lee Willing, Encinitas, CA (US)

(73) Assignee: Astec International Limited, Hong Kong (HK)

( * ) Notice: Subject to any disclaimer, the term of this patent is extended or adjusted under 35 U.S.C. 154(b) by 0 days.

(21) Appl. No.: 10/167,526

(22) Filed: Jun. 11, 2002

(65) Prior Publication Data

US 2003/0008550 A1 Jan. 9, 2003

Related U.S. Application Data

(63) Continuation-in-part of application No. 09/558,646, filed on Apr. 26, 2000, now Pat. No. 6,402,546.
(60) Provisional application No. 60/131,227, filed on Apr. 27, 1999.

(51) Int. Cl.[7] .............................................. H01R 13/72
(52) U.S. Cl. ............................. 439/501; 439/4; 439/174
(58) Field of Search .................... 439/501, 131, 439/174, 173, 172, 4

(56) References Cited

U.S. PATENT DOCUMENTS

| | | | |
|---|---|---|---|
| 3,346,705 A | 10/1967 | Slinkard et al. ............. 191/12.4 |
| 3,657,491 A | 4/1972 | Ryder et al. ............. 191/12.2 R |
| 4,038,805 A | 8/1977 | Holladay ...................... 53/118 |
| 4,114,736 A | 9/1978 | Scherenberg ............... 191/12.4 |
| 4,232,837 A | 11/1980 | Cutler et al. ................. 242/107 |
| 4,244,536 A | * 1/1981 | Harrill ..................... 242/405.3 |
| 4,485,278 A | 11/1984 | Schaller et al. ............. 191/12.4 |
| 4,856,999 A | 8/1989 | Flohr ............................ 439/52 |
| 4,901,938 A | 2/1990 | Cantley et al. ........... 242/107.1 |
| 5,114,091 A | 5/1992 | Peterson ................. 242/107.11 |
| 5,489,010 A | 2/1996 | Rogers .................. 191/12.2 R |
| 5,507,667 A | 4/1996 | Hahn et al. ................. 439/501 |
| 5,540,596 A | 7/1996 | Bothe et al. ............... 439/76.1 |
| 5,577,932 A | 11/1996 | Palmer ........................ 439/501 |
| 5,613,863 A | 3/1997 | Klaus et al. ................. 439/131 |
| 5,634,806 A | 6/1997 | Hahn .......................... 439/173 |
| 5,720,628 A | 2/1998 | Usui et al. .................... 439/502 |
| 5,738,548 A | * 4/1998 | Rutulante ................... 439/652 |
| 5,848,907 A | 12/1998 | Chen ........................... 439/172 |
| 5,934,921 A | 8/1999 | Doong ........................ 439/172 |
| 6,233,167 B1 | 5/2001 | Chen et al. ................. 363/146 |
| 6,325,665 B1 | 12/2001 | Chung ........................ 439/501 |

* cited by examiner

Primary Examiner—Tulsidas Patel
Assistant Examiner—Hae Moon Hyeon
(74) Attorney, Agent, or Firm—Coudert Brothers LLP

(57) ABSTRACT

An electrical adapter having a manually retractable cable assembly where the electrical contacts of the retractable cable assembly are disposed along an axis of rotation to minimize the friction between the cable and contacts therein when the cable is extended and retracted. The electrical adapter includes a housing; an electrical plug assembly including an interchangeable module coupled to an adapter module, the interchangeable module having a plurality of prongs for receiving a first voltage when mated with an electrical receptacle, and a converter electrically coupled to the assembly for converting the first voltage into a second voltage; and a retractable cable assembly supported by the housing and electrically coupled to the converter. The retractable cable assembly includes a cable coupled at one end to an electrical plug for outputting the second voltage, a reel for winding and unwinding said cable, the reel being rotatably supported by the housing, a wheel mounted to the reel for enabling the cable to be manually dispensed from and retracted into the housing.

20 Claims, 18 Drawing Sheets

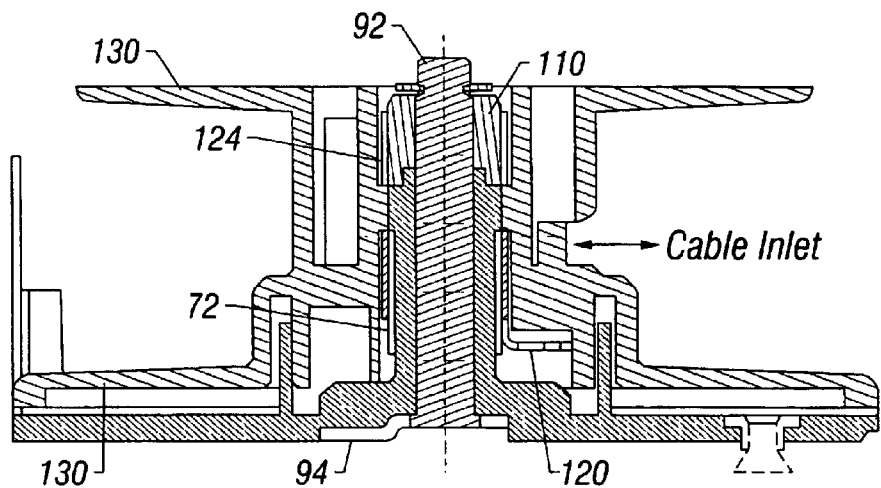
FIG. 15
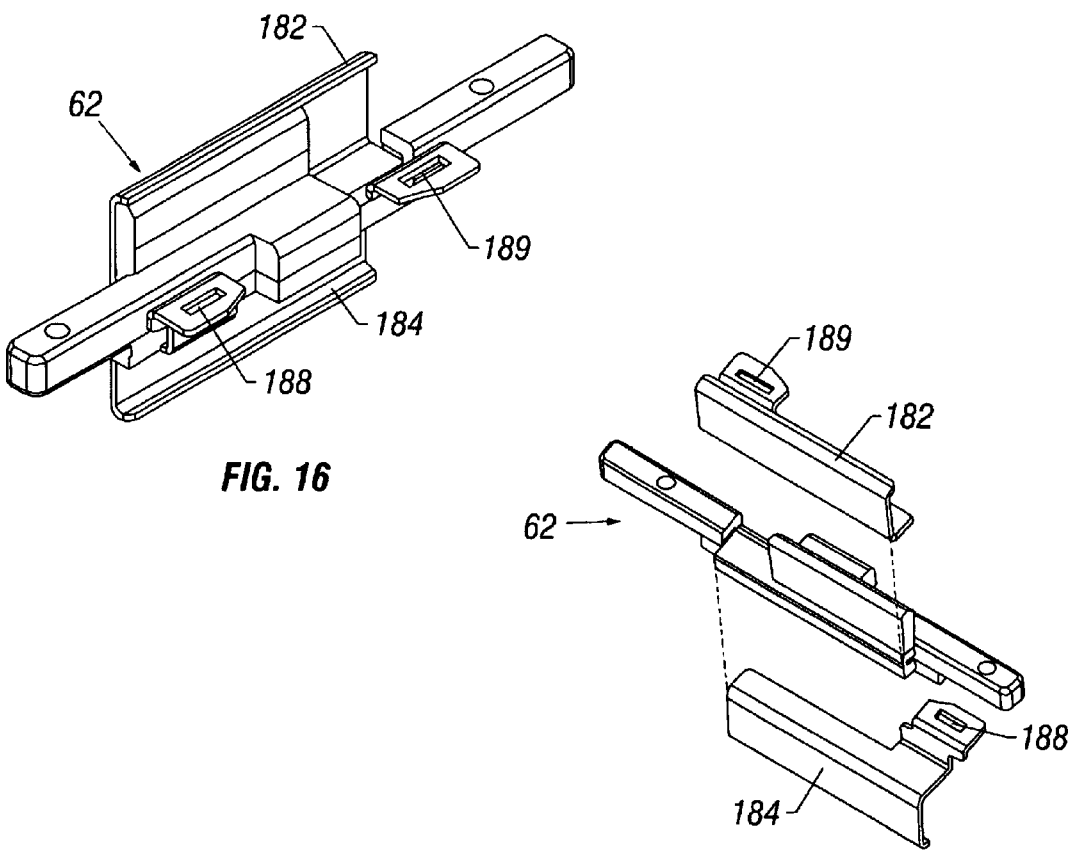
FIG. 16
FIG. 17

ADAPTER WITH MANUALLY RETRACTABLE CABLE ASSEMBLY AND ELECTRICAL PLUG ASSEMBLY

CROSS REFERENCES TO RELATED APPLICATIONS

This application is a continuation-in-part of copending application Ser. No. 09/558,646 filed on Apr. 26, 2000, which in turn claims the benefit of U.S. Provisional Application No. 60/131,227 filed on Apr. 27, 1999.

FIELD OF THE INVENTION

The present invention relates generally to electrical adapters for mobile phones, portable notebook computers and associated chargers, and more particularly to electrical adapters having both a retractable cable assembly that is used to store corresponding cables in a convenient manner, and an electrical plug assembly for use with various types of electrical outlets.

BACKGROUND OF THE INVENTION

A wide variety of electrical devices typically draw AC power from a commercial source, usually delivered through a wall receptacle or socket, but require that this AC power be converted into one or more DC voltages for powering these devices. Electrical adapters have been used extensively throughout the world to provide such DC voltages to these electrical devices.

A common disadvantage of prior art electrical adapters is that they are conventionally equipped with a cable long enough to accommodate the expected distance between a power source such as a wall plug and the expected position of the device to be powered. In practice, however, the device is often much closer to the power source than the adapter manufacturer expects. As a result, the excess cabling is often allowed to lie or hang loose and become intertwined with other cabling. This is at best unsightly and at worst a source of electrical problems.

Consequently, what is desired is a means for storing the cables of an electrical adapter efficiently and conveniently, including means that would be feasible especially in situations where the adapter is used while traveling, or in situations where portability of the electrical device being powered by the adapter is essential. What is needed is a suitably small ergonomic means for retracting the cables, thereby allowing the cables to be selectively stored when not required by the user. It would be ideal if the cables could be stored and retrieved, as a user desires. This would allow a consumer to selectively extend or shorten the cabling of the electrical adapter on an as-needed basis depending upon the circumstances and application.

Retractable cable assemblies are one solution to the problem of selectively extending and shortening the cabling ergonomically. For example, retractable cable assemblies are commonly used for the AC cord on a vacuum cleaner. However, in such applications, there are few size constraints on the retraction mechanism. Additionally, retractable cables are often used for the cable connecting earphones to a personal stereo. These conventional retractable cable assemblies, while providing convenient cable handling, are inadequate for addressing the challenges faced with those electrical devices in the nature of a notebook computer or mobile phone. The challenge that the inventors of the present invention face concern electrical adapters for electrical devices that include cables carrying significantly more current (e.g., 2–5 Amps) than a cable for an earphone and require a heavier gauge wire which is less flexible and therefore difficult to retract. Because size is critical for the electrical adapter of the present invention, the conventional retractable mechanisms for storage of cables of vacuum cleaners and stereo earphones are ill-suited. What is therefore needed is a retractable cable assembly that is part of an electrical adapter that provides a compact manner for storing a low voltage cable, which may require heavy copper in the wire for a given adapter power rating.

Because many electrical devices are sold for use throughout the world, and because a world standard for electrical power requirements is lacking for the operation of these electrical devices, it would be highly desirable to provide an electrical adapter that is not only portable, but is able to accommodate various electrical plug assemblies, which may include a high voltage plug and converter circuitry, used in different parts of the world. Where the electrical devices are notebook computers and mobile phones used with electrical adapters that have electrical plugs inserted into an electrical receptacle, it would be beneficial if the electrical adapter is suitable for use with several countries' electrical plug requirements. With people traveling worldwide, it is unpredictable for the consumer to know which particular type of receptacle will be employed in a destination country. To carry several adapters and adapter prongs while traveling and to anticipate a particular country's electrical prong being used is not only logistically cumbersome, but also a burden, as multiple parts become easily lost.

Conventionally, the converters within the electrical adapters are designed to receive a range of voltage inputs so that only a single adapter need be carried. But, in order to comply with various outlets that deliver AC power around the world, consumers typically carry a variety of input cords, each with a different type of plug. Moreover, there are commercially available electrical adapters sold for the purpose of accommodating travelers, and which are mechanical assemblies having on one end an electric plug, and on the other end, a socket accepting the standard plug interengageable with a particular country's type of receptacle. However, the parts required for these options are very bulky and can be heavy. Although these conventional electrical adapters permit the conversion of one type of electrical energy to another type, and fulfill their respective particular objectives and requirements, they do not disclose an adapter with a retractable cable assembly and interchangeable electrical plug assembly for use with a mobile phone, portable personal computer and their corresponding chargers that overcome all of the above-mentioned drawbacks.

FIGS. 1–3 illustrate the above-mentioned disadvantages of the prior art which the present invention is designed to overcome. Specifically, FIG. 1 is a perspective view of an exemplary prior art electrical adapter having a long cable. Typically, when a consumer first purchases electrical adapter 10 from the manufacturer, it arrives with the electrical cable 12 bundled and tied with a wire-twist 16 as shown. Cable 12 is coupled to a plug 14 for connection with the electrical device (not shown). Removing the wire-twist allows the cable to be used in an extended fashion over its entire length. As is seen, cable 12 is a low voltage cable for carrying the DC voltage to the mobile electrical device, which may be a portable personal computer (e.g. notebook), mobile phone, or a corresponding electrical charger that requires operation from an AC power source. Although not shown in FIG. 1, electrical adapter 10 includes a converter for converting the AC power to a DC output voltage.

As shown in the perspective view of FIG. 2, electrical adapter 10 is further coupled to a high voltage cable 16, for conventionally carrying the AC power from a conventional AC power outlet, via a receptacle plug 18 shaped to enable insertion into the AC power socket. Similarly with respect to cable 12, a user upon purchasing the electrical adapter typically finds cable 16 tied with a wire-twist from the manufacturer. With use however, these cables 12, 16 become tangled and twisted, thereby making the electrical adapter 10 logistically awkward as a unit to use, as seen in FIG. 2. This is especially true when the electrical adapter is used for providing power to a portable personal computer having a variety of attachments each requiring a separate cable attached to the port of the computer and to the peripheral devices. The multiple cables generally become tangled and interfere with use of the electrical device. For example, a portable computer powered using the electrical adapter situated at a desk with many other peripheral devices attached thereto in close proximity to a wall-mounted electrical receptacle may have many wires in a tangled state.

Additionally, a problem with the conventional electrical adapter 10 is that the cables 12, 16 are often wound around the unit by hand and stored loosely as shown in FIG. 2. This is highly undesirable since it may result in the cables unraveling and the unit becoming bulky, thereby being especially cumbersome when the electrical adapter is put into a briefcase. Excessive wear and tear of the cables may also be experienced as a result. Depending upon the patience of the consumer, the cables may be tied together to prevent unraveling, usually with a wire-twist, rubber band, tie-wrap or string.

The retractable cable assemblies of the prior art often comprise a retractor having a base subassembly supporting a reel. FIG. 3 shows a partially-exploded perspective view of a retractor 30 of the prior art having a base subassembly 32 rotatably supporting reel 34 thereabout. Reel 34 is operable to rotatably wind and unwind a cable 36 by means of a torsion spring coil 38 that is biased in a predetermined direction. Although not shown, the retractor 30 is commonly controlled to selectively preclude rotation of the reel 34 relative to the subassembly 32 by frictionally engaging and locking the reel.

A drawback with such conventional retractors is that they include circular electrical contacts 39 disposed along the center portion of the cable reel 34. This results in a larger area being required to implement the electrical contact between the cable and circuitry of the electrical adapter. Another problem with this embodiment is that it results in greater friction being exerted on the cables and their electrical contact points. This is highly undesirable since it may result in accelerated wear-and-tear of the connections and components, thereby leading to earlier degradation of the retractor. Such degradation leads to the integrity of the electrical contacts being compromised. Moreover, the structure of the circular contacts 39 in the conventional retractor, such as that shown in FIG. 3, substantially increases the cost and complexity of manufacturing. Consequently, the objective of the invention as described below is an improved retractor that provides the benefits of minimizing the size of the electromechanical components, of reducing the friction between the cable and the electrical contacts occurring during rotation of the reel, and of providing a cost-effective manner of fabrication. Another objective of the invention is the inclusion of ergonomic features that aid the consumer in selectively extending and retracting a cable manually, obviating the need for an automatic retraction mechanism, such as a torsion spring coil as in the retractor of FIG. 3.

Consequently, it would be advantageous if a consumer could use a single electrical adapter with the storage functions desired herein, in an interchangeable manner so as to accommodate various types of electrical receptacles, and with a size of the conventional AC/DC adapter package being considerably reduced by restructuring the cable storage and packaging criteria. Furthermore, it would be beneficial if such an electrical adapter included ergonomic features that aided the consumer in selectively extending and retracting a cable manually.

SUMMARY OF THE INVENTION

The present invention is directed towards an electrical adapter having a manually retractable cable assembly for a low voltage cable, where the electrical contacts of the retractable cable assembly are disposed along an axis of rotation to minimize the friction between the cable and contacts therein when the cable is selectively extended and retracted. The electrical contacts of the present invention enable constant electrical conduction between components when the cable is extended from and retracted into the retractable cable assembly.

Broadly stated, the present invention provides an electrical adapter, comprising a housing; an electrical plug assembly supported by the housing, the assembly including an interchangeable module coupled to an adapter module, the interchangeable module having a plurality of prongs for receiving a first voltage when mated with an electrical receptacle, and a converter electrically coupled to the assembly and for converting the first voltage into a second voltage; and a retractable cable assembly supported by the housing and electrically coupled to the converter, the retractable cable assembly including a cable coupled at one end to an electrical plug for outputting the second voltage, a reel for winding and unwinding the cable, the reel being rotatably supported by the housing, a wheel for enabling the cable to be manually dispensed from and retracted into the housing; a pair of first contacts electrically coupled to each other, one of the first contacts being coupled to another end of the cable, supported by the reel and rotatable about the other of the first contacts, a pair of second contacts electrically coupled to each other, one of the second contacts being coupled to the another end of the cable, supported by the reel and rotatable about the other of the second contacts, and a pair of terminals electrically coupled respectively to the other of the first contacts and the other of the second contacts for receiving the second voltage from the converter. For the present invention, the wheel is preferably mounted to the reel.

These and other objects of the present invention will become apparent to those skilled in the art from the following detailed description of the invention and embodiments, the accompanying drawings, specification, and claims.

BRIEF DESCRIPTION OF THE DRAWINGS

FIG. 15 is a cross-sectional view of FIG. 14 taken along line 14—14.

FIG. 16 is a perspective view of the connection means including a track member for the retractable cable assembly of the electrical adapter.

FIG. 17 is an exploded perspective view of the connection means including a track member for the retractable cable assembly of the electrical adapter.

DETAILED DESCRIPTION OF THE INVENTION

The present invention generally comprises an electrical adapter having a manually retractable cable assembly which: (1) enables constant electrical conduction between the electrical contacts and the cable when the cable is being extended and retracted from the retractable cable assembly; (2) decreases the frictional forces encountered by the electrical contacts and cable when the cable is extended and retracted; (3) reduces the overall size of the electrical adapter; (4) enables high power levels to be used with the retractable cable assembly; and (5) provides the additional benefit of portability by being adaptable to various types of electrical plug systems used around the world.

For the present invention, a wheel is used to enable enabling the cable to be manually dispensed from and retracted into the housing. The wheel is mounted onto a reel such that the rotation of the wheel causes the reel to rotate about a central axis to extend or retract the cable from the assembly. The present invention will be described, in further detail with reference to FIGS. 4–43.

Figure 4:
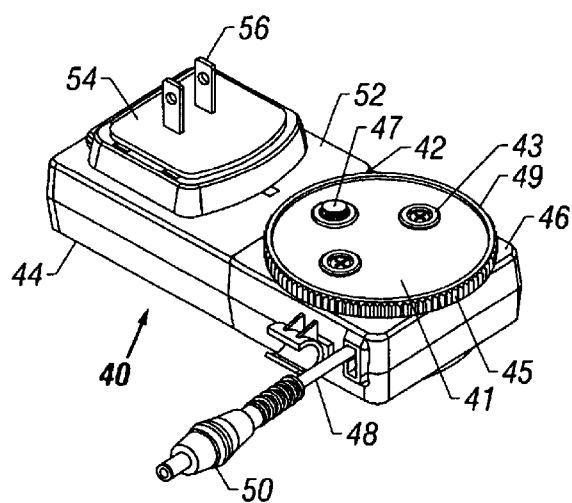
FIG. 4 is a perspective view of a preferred embodiment of the electrical adapter of the present invention having a manually retractable cable assembly and electrical plug assembly with an input including an adapter module coupled to an interchangeable module showing AC power prongs of the type useable in AC power sockets in the United States.

FIG. 4 shows a perspective view of the preferred embodiment of the present invention directed to an electrical adapter 40 having a housing 42, an electrical plug assembly 44 that is supported by the housing 42 and includes an input to be described, a converter (not shown, but to be described subsequently) electrically coupled to the electrical plug assembly, where the input receives a high voltage and the converter converts the high voltage into a low voltage. The electrical adapter 40 includes a retractable cable assembly 46 supported by the housing 42 and electrically coupled to the converter. The retractable cable assembly 46 includes a cable 48 coupled at one end to an electrical plug 50 (e.g., exemplary 6.3 mm diameter) for outputting the low voltage to an electrical device (not shown), such as a portable computer, mobile phone or associated charger, and means for retracting the cable therefrom, as will be described hereinbelow.

Cable assembly 46 includes a wheel 45, as shown in FIG. 4, having an exterior surface 41. Wheel 45 has an exterior surface 41. Wheel 45 includes a grip portion 49 shaped to form a lip disposed along a periphery thereof for manually retracting the cable 48. Grip portion 49 forms an overhang over the retractable cable assembly 46 and includes a shape and texture selected to be grasped by at least a finger of one hand, preferably a thumb, to thereby manually rotate the wheel 45. In particular, the lip of grip portion 49 has a shape and texture for permitting good frictional contact with at least a finger of one hand when grasped, so as to thereby effectively rotate the wheel 45. The periphery of the grip portion is preferably knurled as shown in FIG. 4. Fastening means are included to mount the wheel 45 to the housing 42. Preferably the fastening means includes screws 43 received in co-molded bores (not shown) disposed and supported within the housing 42.

Figure 13:
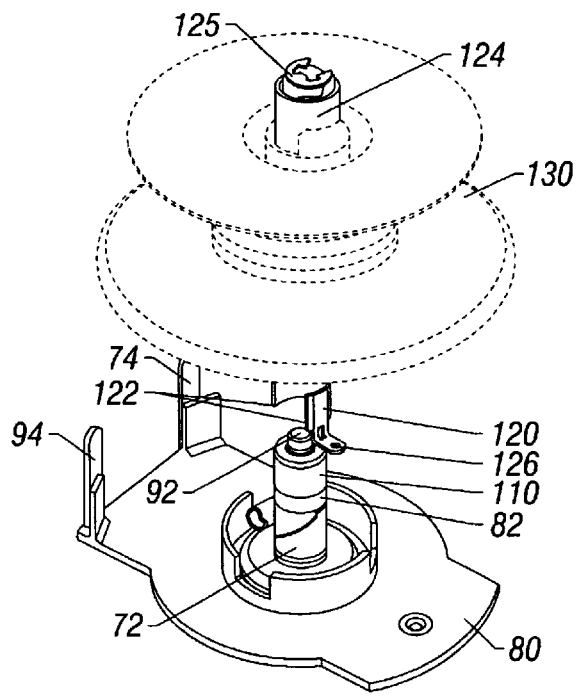
FIG. 13 is an exploded perspective view of the base subassembly of FIG. 11 further including interengageable contacts rotatable about an axis of rotation (exemplary reel 130 being shown in phantom).
Figure 14:
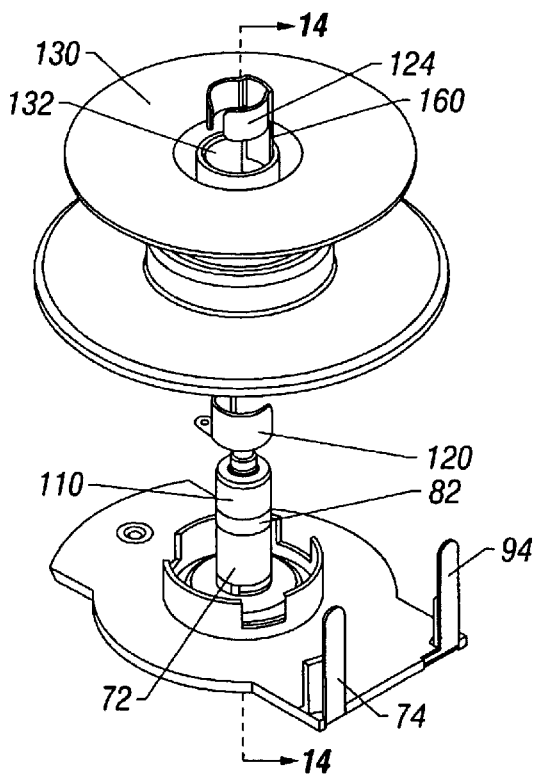
FIG. 14 is an exploded perspective view of the base subassembly of FIG. 13 supporting an exemplary reel for retracting a cable.

The wheel 45 is mounted onto a reel 130 (shown in FIGS. 13 and 14). In the preferred embodiment, the retractable cable assembly comprises interengageable surfaces formed on the reel and the wheel, wherein the wheel is rotatably supported by the reel such that the rotation of the wheel causes the interengageable surfaces to cooperate with each other, which in turn causes the reel to rotate about a central axis to extend or retract the cable from the assembly.

In the preferred embodiment shown in FIG. 4, surface 41 of wheel 45 supports a rotatable knob 47. The knob 47 may be grasped by a thumb and index finger of one hand and is rotatable in the clockwise and counter-clockwise directions. Rotating the knob 47 causes wheel 45 to rotate to enable cable 48 to either extend or retract. In order to selectively dispense the cable 48 from the assembly, a user pulls on the cable. For the preferred embodiment, in order to manually retract the cable 48 back into the assembly, a user either grasps the grip portion 49 of the wheel 45 or uses a thumb and index finger of one hand to engage the knob 47, in order to rotate the wheel 45.

As shown in FIG. 4, the electrical plug assembly comprises an adapter module 52 coupled to an interchangeable module 54. The interchangeable module 54 has a plurality of prongs 56, which may be any conventional prongs modified to accommodate a variety of standard electrical wall sockets or outlet receptacles (not shown). The plurality of prongs 56 shown in FIG. 4 is exemplary of a pair of blades conventionally used in the United States.

Figure 5:
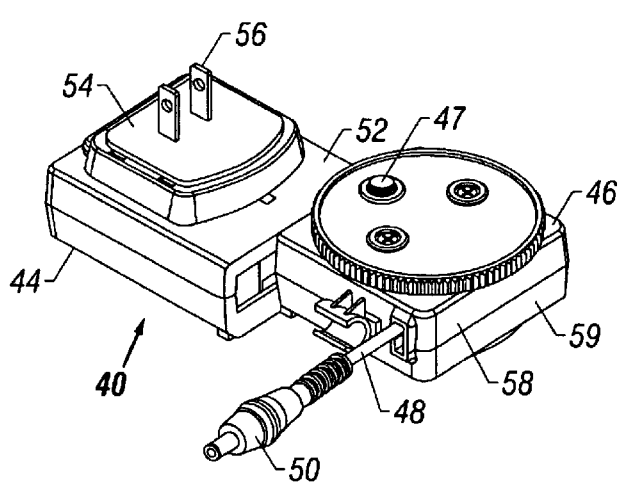
FIG. 5 is a perspective view of the electrical adapter of FIG. 4 showing the manually retractable cable assembly of the present invention being slidably detached from the electrical plug assembly.

FIG. 5 is a perspective view of the electrical adapter 40 of the present invention showing that the electrical plug assembly 44 is a first module and a retractable cable assembly 46 is a second module, slidably connectable to engage each other when in an operative position as shown in FIG. 4. Retractable cable assembly 46 is primarily used for storing cable 48. The retractable cable assembly 46 allows cable 48 to be selectively extended from the assembly 46 by pulling on the cable to a desired length. The retractable cable assembly 46 comprises a housing which may be formed from a top cover 58 supported by a bottom cover 59 as seen in FIG. 5. Wheel 45 is preferably made of a material similar to that of covers 58, 59. It will be appreciated by those of ordinary skill in the art that the electrical plug assembly 44 and retractable cable assembly 46 may be manufactured as a single integral unit to thereby form a housing, rather than being slidably connectable modules. However, in the preferred embodiment of FIGS. 4–5, assemblies 44 and 46 are separate casings that are mechanically and electrically coupled together in a manner as will be described in detail below.

Figure 6:
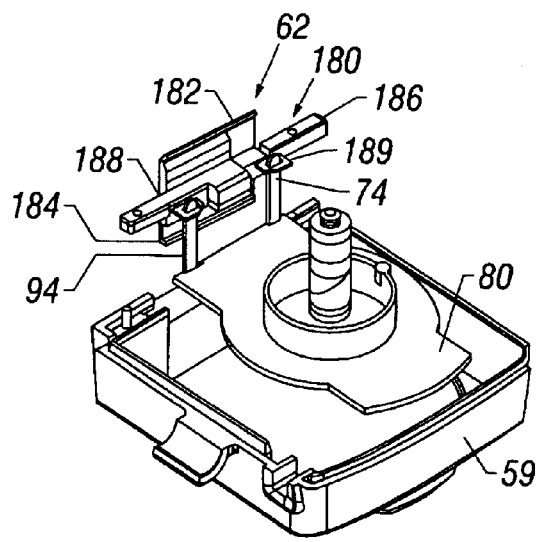
FIG. 6 is a partially-exploded perspective view of a portion of the retractable cable assembly of the present invention.

FIG. 6 shows a partially exploded perspective view of a portion of the retractable cable assembly 46, comprising bottom cover 59 supporting a portion of the means for retracting the cable. Bottom cover 59 and top cover 58 (not shown in FIG. 6) are preferably manufactured from a non-conductive material, preferably a good electric and thermal insulator. Also coupled to the retractable cable assembly and the base sub-assembly is a track member 62, which is disposed along one side of the retractable cable assembly 46.

Figure 7:
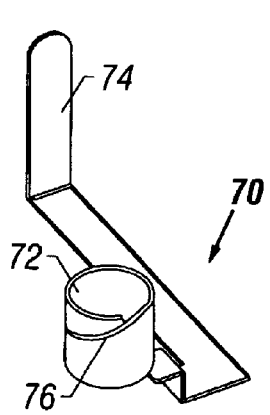
FIG. 7 is a detailed perspective view of contact means defining a circular sleeve and having a terminal according to the preferred embodiment of the present invention.

The means for retracting the cable according to the preferred embodiment of the retractable cable assembly of the present invention includes an inventive arrangement of a number of components, which will be also referenced with respect to FIGS. 7–17. FIG. 7 is a perspective view of contact means 70 defining a circular sleeve 72 and having a terminal 74. Circular sleeve 72 includes a channel disposed therewithin along an axis (not shown) that is both offset laterally from terminal 74 and in generally parallel relationship with terminal 74. Contact means 70 may be fabricated from any high conductivity material, but is preferably manufactured from a phosphor bronze or equivalent for its excellent conductive qualities. The circular sleeve 72 is substantially cylindrical in shape, and is preferably formed by any conventionally known manufacturing process for curling a malleable conductive material into the structure shown. The circular sleeve 72 comprises a spiral inclined portion 76 which is dimensioned to allow a contact 120, shown in FIG. 12, to rotate steadily and smoothly about circular sleeve 72 when the means for retracting the cable is assembled.

Figure 8:
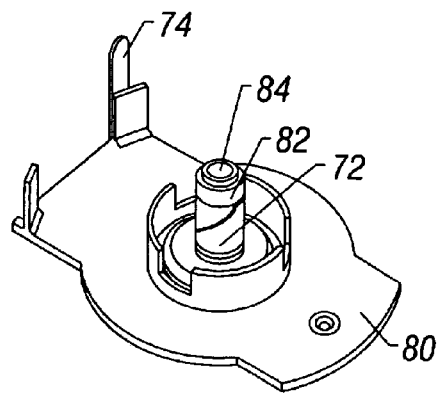
FIG. 8 is a detailed perspective view of the contact means of FIG. 7 supported by the base subassembly according to the preferred embodiment of the present invention.

As is shown in the perspective view of FIG. 8, the means for retracting the cable further comprises a base subassembly 80 for rotatably supporting a reel (not shown) to extend and retract a cable (not shown). Contact means 70 is preferably fabricated as an insertable molded part of base sub-assembly 80, but may be integrated with the base subassembly using any conventionally known manufacturing process consistent with permitting contact means 70 to be embedded into the base subassembly 80 so that only the conductive areas are exposed, namely terminal 74 and circular sleeve 72. Base subassembly 80 is preferably manufactured from a non-conductive material that is a good electric and thermal insulator, so that it has no conductive metal in those regions adjacent to the contact means 70, to thereby prevent deleterious shorting of contact means 70 with any adjacent structure. As seen in FIG. 8, base subassembly 80 includes a support means, including at least a shaft 82 extending along a central axis and having a concentric bore 84 therewithin.

Figure 9:
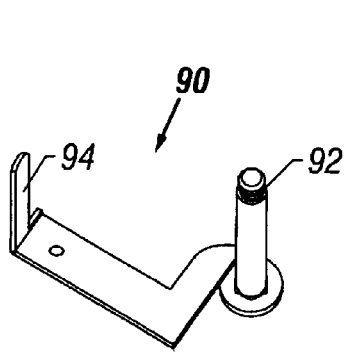
FIG. 9 is a detailed perspective view of contact means defining a shaft and having a terminal offset laterally of the shaft according to the preferred embodiment of the present invention.

FIG. 9 shows a detailed perspective view of contact means 90 defining a shaft 92 and having a terminal 94 offset laterally from shaft 92. The terminal 94 is disposed in a generally parallel relationship with shaft 92. Contact means 90 may be fabricated from any high conductivity material similar to that of contact means 70, and is likewise preferably manufactured from a phosphor bronze or equivalent for its excellent conductive qualities. However, contact means 90 could also be fabricated by having shaft 92 connected, preferably riveted or fastened consistent with any other conventional electromechanical coupling method, to terminal 94 so long as terminal 94 is in electrical contact with shaft 92 and will have the same polarity.

Figure 10:
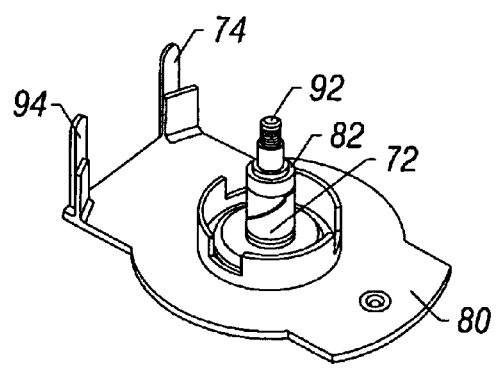
FIG. 10 is a detailed perspective view of the contact means of FIG. 9 supported by the base subassembly of FIG. 8 according to the preferred embodiment of the present invention.

As shown in the detailed perspective view of FIG. 10, contact means 90 is preferably fabricated as an insertable molded part of base sub-assembly 80, but may be integrated with the base subassembly using any conventionally known manufacturing process consistent with permitting base sub-assembly 80 to support contact means 90 so that only the conductive areas are exposed, namely terminal 94 and shaft 92. This process is similar to that described for contact means 70 with reference to FIG. 8. Although not shown in FIGS. 8 and 10, in order for each of the contact means 70 and 90 to maintain a separate electrical polarity, the process of integrating support contact means 70 and 90 with base subassembly 80 must account for ensuring that the non-conductive material of base subassembly 80 electrically insulates contact means 70 from being in adjacent contact with contact means 90, in order to prevent deleterious shorting therebetween. As seen in FIG. 10, when contact means 90 is integrated with base subassembly 80, shaft 92 is inserted through bore 84 of shaft 82 to extend therethrough. Accordingly, terminal 94 is electrically coupled to that portion of shaft 92 protruding through bore 84 as seen in FIG. 10.

Figure 1:
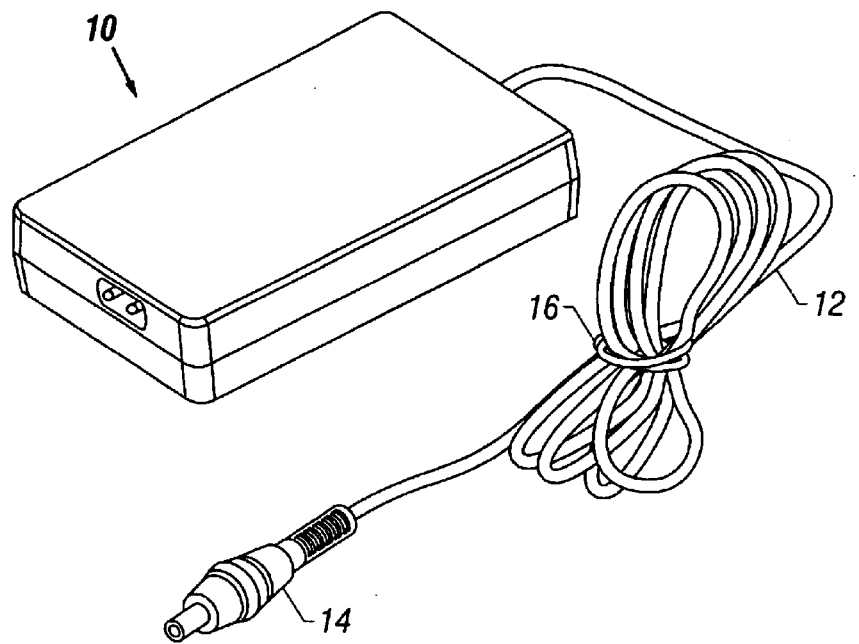
FIG. 1 is a perspective view of an exemplary prior art electrical adapter with an electrical cable bundled and tied together.
Figure 2:
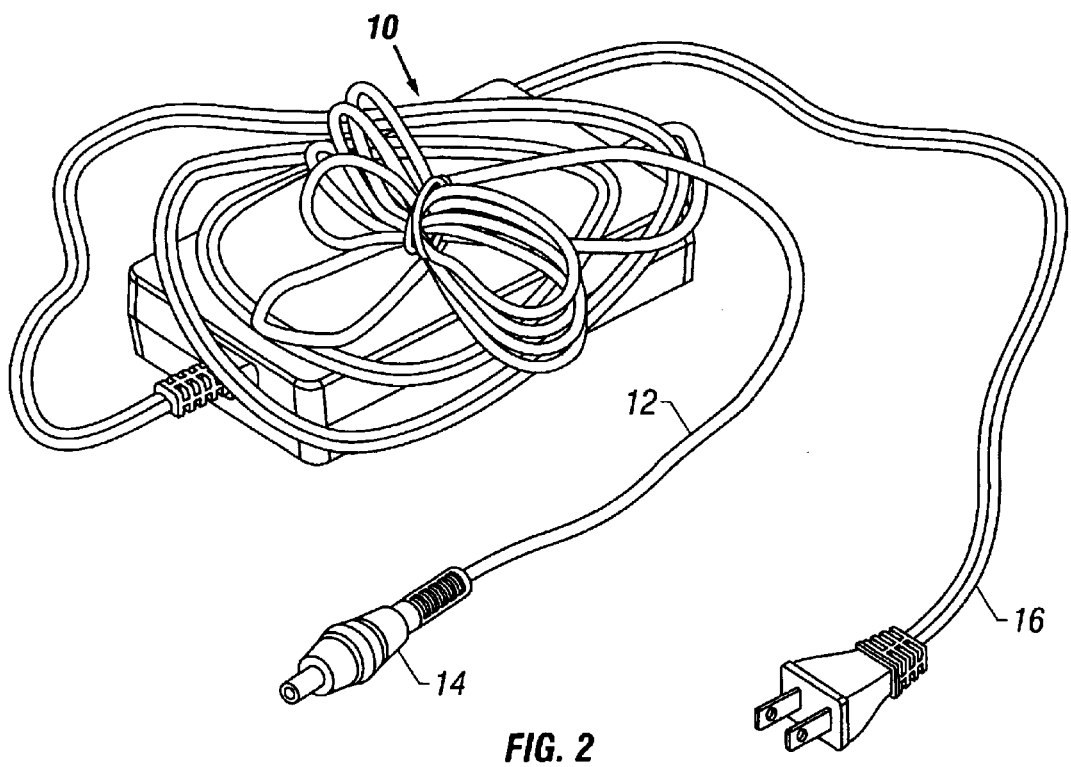
FIG. 2 is a perspective view of FIG. 1 showing electrical cables unraveled and wound by hand around the adapter.
Figure 3:
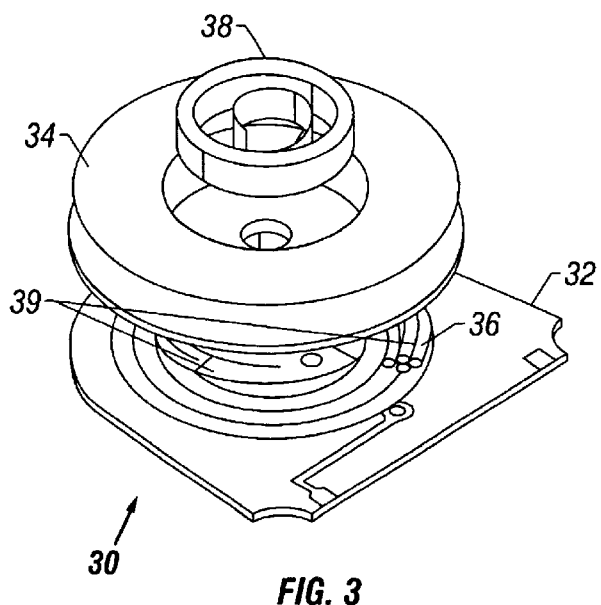
FIG. 3 is a partially-exploded perspective view of an exemplary retractor of the prior art having a base subassembly rotatably supporting a reel.
Figure 11:
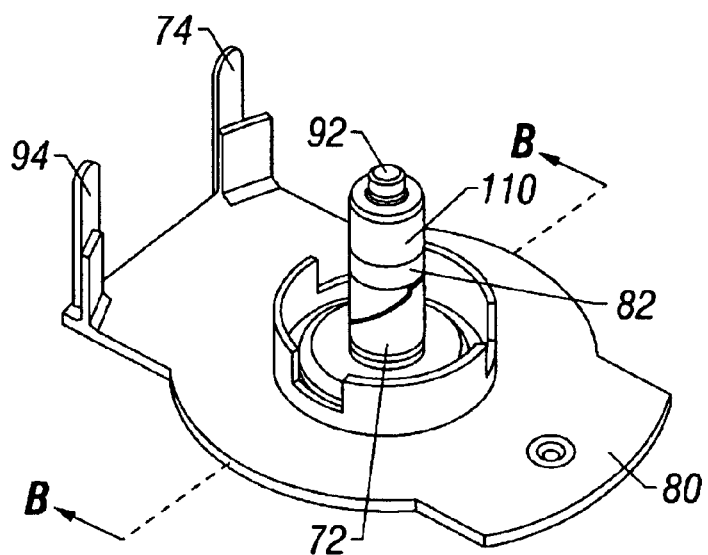
FIG. 11 is a perspective view of the assembled base subassembly of FIG. 10 with an electrical conductive bushing.
Figure 12:
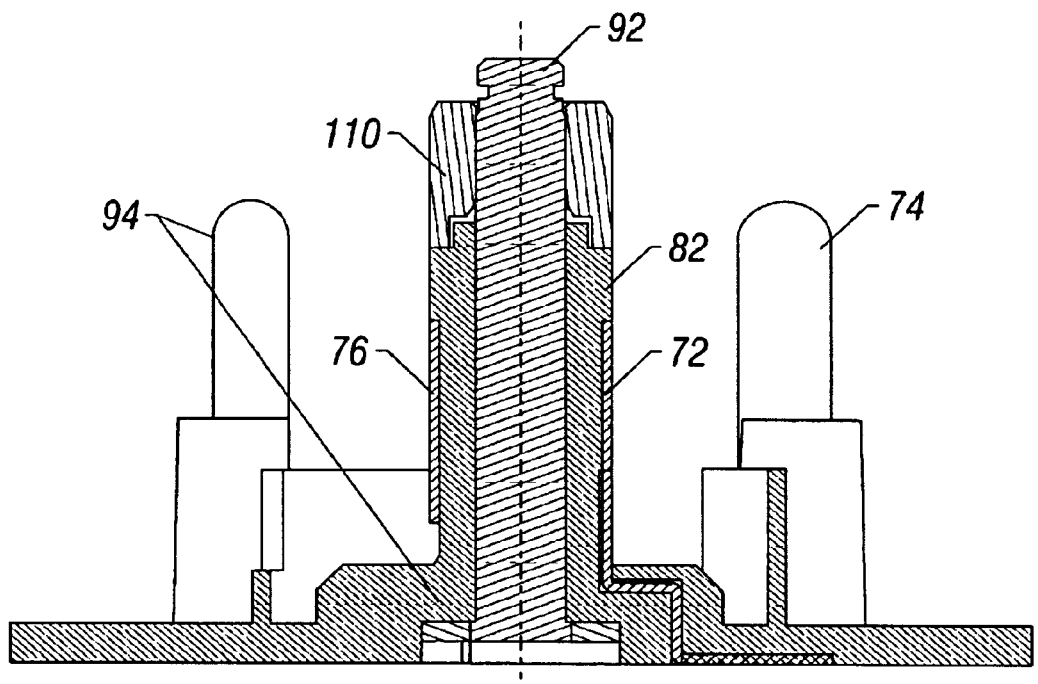
FIG. 12 is a cross-sectional view of FIG. 11 taken along line B—B.

In order to maintain shaft 92 in place with respect to bore 84 and the support means overall, any conventional manner of securing shaft 92 in place may be used, including the preferred manner of applying an electrically conductive bushing 110 to be force-fit atop shaft 92 as shown in the perspective view of FIG. 11. FIG. 12 is a cross-sectional view of FIG. 11 taken along line B—B. It can be seen in FIGS. 11 and 12 that contact means 70 comprises terminal 74 in electrical contact with sleeve 72, and that contact means 90 comprises terminal 94 in electrical contact with bushing 110, while shaft 82 is disposed therebetween so as to provide electrical insulation between the differing polarities of the contact means 70 and 90. It will become apparent to those of ordinary skill in the art that the support means for base subassembly 80 provides support for a reel to rotate thereabout; accordingly, a further detailed description of the support means will not be described herein except for reference to the support means, the sleeve 72, shaft 82, and shaft 92 and other related components introduced and subsequently being disposed generally along a central axis of rotation in relation to one another so that a reel having a bore defined therein, and similar to reel 34 shown in FIG. 3, may thereby be rotatably supported.

As seen in FIG. 13, an exploded view of the means for retracting the cable further includes interengageable contacts 120 and 124. (An exemplary reel 130 is shown in phantom in FIG. 13 and is described further below and shown in more detail in FIGS. 13–17. It is preferable that contacts 120 and 124 be manufactured from a good electrically conductive material such as that of contact means 70 and 90 already described. Contact 120 is formed to be generally cylindrical in shape and dimensioned to accommodate rotational movement around sleeve 72. Contact 120 may further include a pair of vertical (double) contact edges 122. When contact 120 rotates about circular sleeve 72, the inclined spiral portion 76, which in itself prevents any gaps from occurring in the sleeve, prevents interruptions in the electrical connection therebetween, and permits a continuous and smooth rotational movement. As will be described in greater detail below, contact 120 further includes a portion 126 for coupling to at least one conductor of a cable thereto. Any conventional technique of electro-mechanically coupling a cable to a contact may be used, e.g., soldering or crimping. Both terminal 74 and sleeve 72 are in electrical contact with interengageable contact 120.

In a similar manner, contact 124 is formed to be generally cylindrical in shape and dimensioned to accommodate rotational movement around bushing 110. Both terminal 94 and bushing 110 are in electrical contact with contact 124. One significant advantage of disposing the electrical contacts along the center axis of rotation for the retractable cable assembly is the reduction of rotational friction generated by the cables and the contact points. Additionally, this inventive structure increases the contact pressure at the point of the contacts 120 with 72 and 124 with 110 due to the center axis of rotation having a small radii. The increased pressure is useful for ensuring a reliable electrical connection therebetween.

FIGS. 14 and 15 show views of an exemplary reel 130 having means for defining a bore therein. When the support means is inserted through bore 132, the base subassembly 80 rotatably supports reel 130. In order to permit interengageable contact 120 to rotate about sleeve 72 and be electrically coupled thereto, and in order to permit interengageable contact 124 to rotate about bushing 110 and be electrically coupled thereto, the contacts 120 and 124 are disposed about the center axis of rotation in an inventive manner as seen in the cross-sectional view of FIG. 15. Reel 130 is preferably formed from a non-conductive material, e.g., plastic, and includes walls so as to prevent the deleterious shorting of the interengageable contacts 120 and 124. FIG. 13 shows a ring 125, preferably an E-ring 125 as shown, for locking the retractable reel 130 when it is assembled.

Referring back to FIG. 4, cable 48 includes an end applied (e.g., dressed) to the interengageable contacts. This permits the conductors of cable 48 to be electrically coupled to a respective one of interengageable contacts 120, 124 shown in FIGS. 14 and 15. As cable 48 is extended or retracted, contact 120 and contact 124, when assembled as part of the means for retracting the cable, will rotate around co-radial portions of sleeve 72 and bushing 110, respectively. Reel 130 is preferably pre-assembled with cable 48 already coupled to interengageable contacts 120, 124 supported therewithin, so that the cable and reel as a unit may be easily inserted into the support means of the base subassembly to thereby form the means for retracting the cable.

Referring back to FIG. 6, a portion of the interengageable portions for slidably engaging the adapter module into and out of an operative position with the retractable cable assembly are shown. As seen more clearly in FIGS. 16 and 17, the interengageable portions includes track member 62 which provides the connection means for the retractable cable assembly to be electro-mechanically coupled to the adapter module of the electrical plug assembly, and includes conductive contacts 182 and 184 that are supported by a holder 186. Holder 186 is preferably manufactured from a material that is a good electrical and thermal insulator, e.g., an insulating plastic material. By contrast, contacts 182 and 184 are preferably manufactured from a material that is a good electrical conductor, e.g., a phosphor bronze or equivalent. Contacts 184 includes a portion having a bore 188 defined therethrough and dimensioned so that terminal 94 may be inserted through bore 188.

As seen more clearly in FIG. 6, contact 182 also includes a portion having a bore 189 defined therethrough and dimension so that terminal 74 may be inserted through bore 189. Bores 188, 189 are preferably at least one tenth of an inch larger in size than terminals 74, 94, since this enables the bores 188, 189 to assist in aligning the track member 62 about the periphery of the retractable cable assembly. Also, the slightly larger diameter and size of bores 188, 189 compared with the diameter of terminals 74, 94 permits the base subassembly 80 to support the track member 62 in a rigid manner. Generally, selecting the diameter of the bores 188, 189 to be several tenths (e.g., two or three) of an inch larger in diameter than terminals 74, 94 also provides an alignment benefit. When track member 62 is assembled with the terminals 74, 94 of the base subassembly 80, it is also preferable that the track member 62 be snap-fit with the bottom cover 59 in order to provide further support therebetween. As will be described in more detail below, the interengageable portions for slidably encasing the adapter module also includes cooperating means formed along the periphery of the adapter module, so that the track member 62 may engage the cooperating means when the adapter module is in an operative position with the retractable cable assembly.

Referring back to FIGS. 4–5, it will be understood by those of ordinary skill in the art that the electrical plug assembly 44 according to one embodiment of the present invention is versatile and is adaptable to accommodate different electrical plug systems around the world. The input of electrical plug assembly 44 includes an interchangeable module 54 coupled with an adapter module 52. Each interchangeable module 54 is directed to a different type of electrical prong to be used with the adapter module to form the electrical plug assembly for the conversion of one form of electrical signal to another (e.g., AC to DC). This may be useful, for example, in the application of allowing a consumer to simply change the interchangeable module depending upon the country's type of electrical receptacle, while continuing to use the same adapter module.

Figure 18:
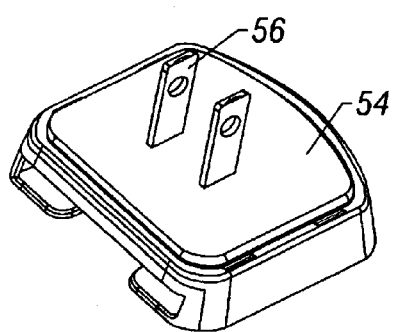
FIG. 18 is a perspective front view of an exemplary interchangeable module with electrical prongs comprising a pair of blade contacts for use with electrical outlets in the United States.

FIG. 18 shows a perspective view of an interchangeable module comprising a pair of electrical blade contacts 56 spaced apart and supported by the interchangeable module. As is conventionally known, the blade contacts 56 are inserted into the positive and neutral slots of an electrical receptacle for receiving AC power. Blade contacts 56 are configured in a way as used in the United States.

Figure 19:
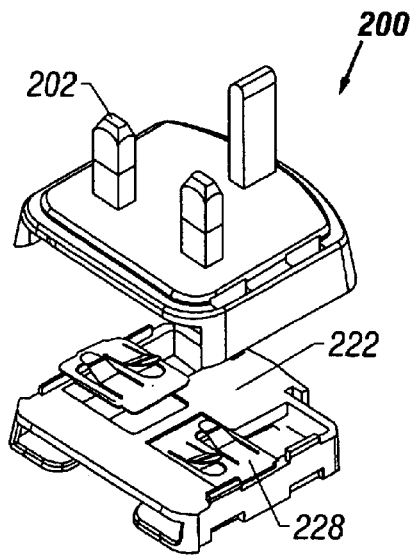
FIG. 19 is an exploded perspective front view of an exemplary interchangeable module with three electrical prongs for use with electrical outlets in the United Kingdom.
Figure 20:
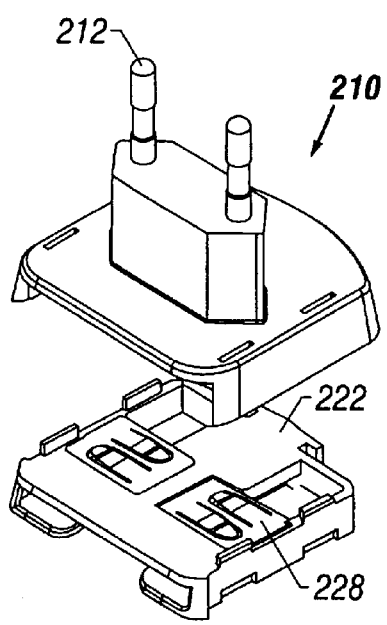
FIG. 20 is an exploded perspective front view of an exemplary interchangeable module with two prongs for use with electrical outlets in Germany.
Figure 21:
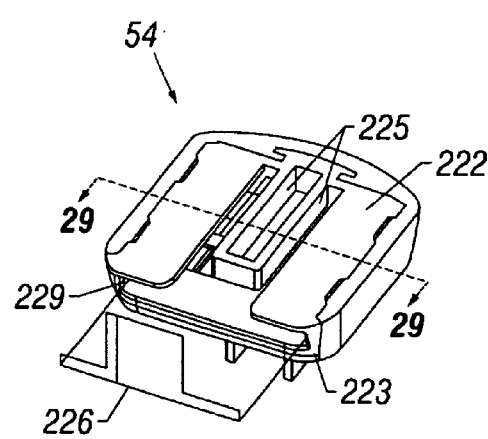
FIG. 21 is a perspective rear view of an exemplary interchangeable module.

In alternative embodiments of the present invention, the interchangeable module may also be configured to operate with electrical plug systems used by other countries. For example, FIG. 19 shows an exploded perspective view of an interchangeable module 200 having three electrical prongs 202 for used in the United Kingdom. FIG. 20 shows an exploded perspective view of an interchangeable module 210 having two electrical prongs 212 for use in Germany.

It will be appreciated by those skilled in the art that the interchangeable modules shown in the embodiments of FIGS. 18–20 employ a similar construction. Referring to a perspective rear view of the interchangeable module 54 in FIG. 21, the interchangeable module 54 preferably comprises a body (e.g., casing) being formed by two parts, although other conventional ways in which to fabricate a single integral casing may be used. When two parts are used, they include an outer housing 220 which receives an inner housing 222 (shown partially cut-away). Both the inner and outer housings 220, 222 are preferably formed from a good nonconductive material, that is both an electrical and thermal insulator. A thermally resistive housing for the interchangeable module 54 assists a user in safely handling the module with its electrical conducting components supported therewithin. When assembled, module 54 shields a user from coming into direct contact with the components that conduct electrical energy that are disposed within module 54.

There are a number of ways that the inner housing may be assembled with the outer housing upon final fabrication. For example, as shown in the exploded perspective view of FIG. 26, a portion of inner housing 222 includes indentations 270 therein. Although only shown from one side of the housing 222, these indentations 270 are symmetrically disposed on an opposite side of the inner housing 222. The indentations are preferably punched through the inner housing during the fabrication process. The outer housing 220 includes pairs of pressure-loadable hooks 272 extending therefrom and symmetrically disposed on two sides of the housing 220. When inner housing 222 and outer housing 220 are assembled together, the hooks 272 are snap-fitted into indentations 270 to thereby secure inner housing 222 within outer housing 220, and to form the body of the interchangeable module 54. Alternatively, outer housing 220 may include built-in ribs 274 which may be welded (e.g., ultrasonic weld) to an opposite surface (not shown) located on inner housing 222 when assembled together. This arrangement ensures a more reliable and firmly supported interchangeable module 54 comprising inner housing 222 and outer housing 220. It will be recognized by those of ordinary skill in the art that alternative methods of securing housings 220 and 222 together include the use of bonding agents, epoxy agents and solvents, so long as such use is consistent with the principles disclosed herein.

Figure 22:
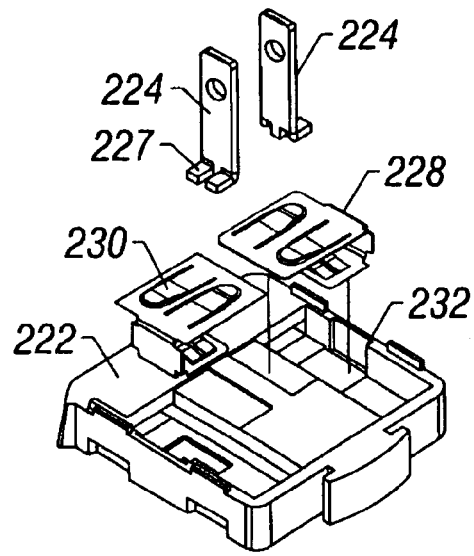
FIG. 22 is an exploded perspective view of the electrical components supported within the interchangeable module of FIG. 18.
Figure 26:
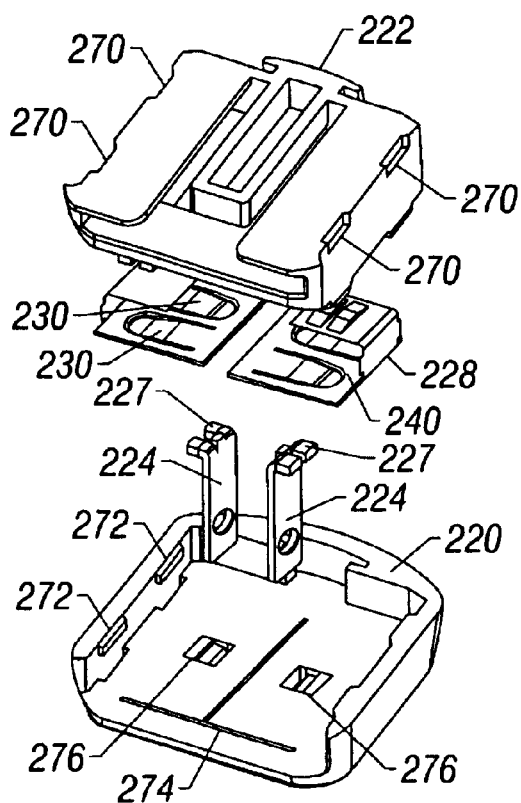
FIG. 26 is an exploded perspective view of the inner and outer housing and electrical components of the interchangeable module of FIG. 21.

FIG. 22 shows an exploded perspective view of the electrical components supported within interchangeable module 54. These components include exemplary electrical prongs 224 which have one end 227 that is matched with spring contacts 228 having spring tabs 230, and are electro-mechanically secured together to form a connection therewith, as seen in the perspective view of FIG. 27. The spring contacts 228 are formed from a good conductive and thermal material, e.g., one that employs a heat conducting spring material or equivalent. The spring contacts 228 are shown to be seated within inner housing 222 and electrically coupled to prongs 224. It will become readily apparent to those of ordinary skill in the art that the prongs 224 may be welded to the spring tabs 230 or adhered in a conventional manner so as to be electro-mechanically connected together. FIG. 26 shows that outer housing 220 includes bores 276 defined therethrough to permit the insertion of the electrical prongs 224. Upon assembly of the inner and outer housings, the spring contacts 228 and ends 227 of the electrical prongs are encapsulated therewithin.

Figure 23:
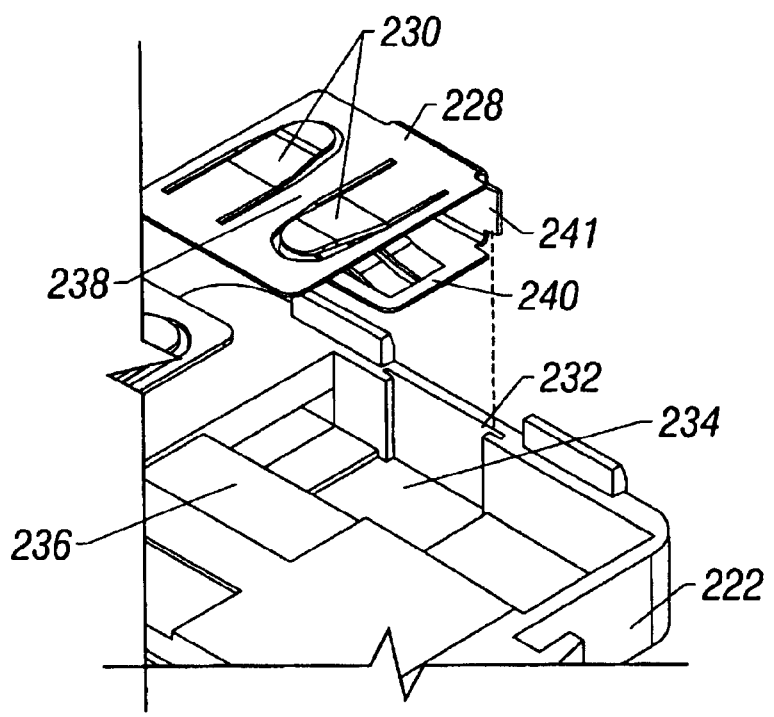
FIG. 23 is an exploded partially cut-away detailed perspective view of an exemplary spring contact for one polarity and the inner housing of the interchangeable module of FIG. 22.

As shown more clearly in the exploded detailed perspective view of FIG. 23, the interior of inner housing 222 is configured to receive spring contacts 228. The inner housing 222 includes a groove 232 and several recessed portions 234 and 236. The spring contacts 228 are formed with top 238 and bottom 240 surfaces that are respectively received in the recessed portions 236 and 234. Additionally, the spring contacts 228 are formed with winged portions 241 that are dimensioned to slide into and be in a friction-fit with groove 232, thereby allowing the spring contacts to be securely seated within the recesses of inner housing 222. Although FIG. 23 illustrates this arrangement for one side of the inner housing, it is noted that a symmetrical arrangement exists on the other side of inner housing 222.

Figure 24:
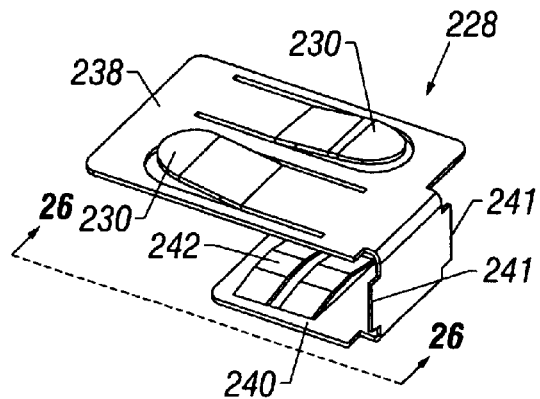
FIG. 24 is a perspective view of the exemplary spring contact of FIG. 23.
Figure 25:
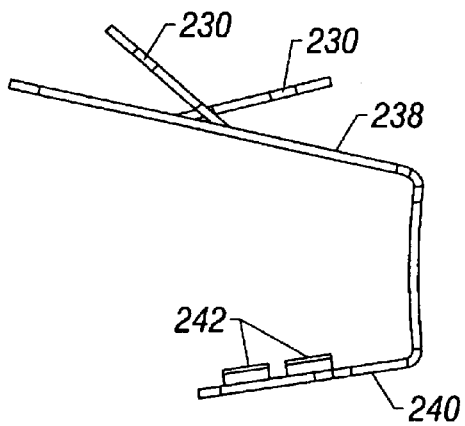
FIG. 25 is a side view of the spring contact of FIG. 24 along line 26—26.
Figure 27:
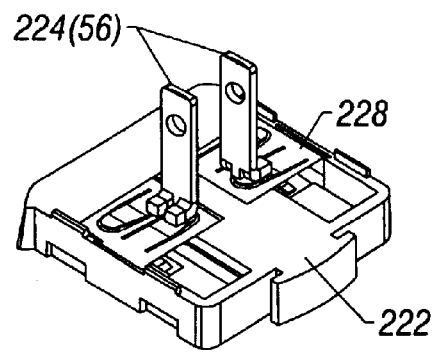
FIG. 27 is a perspective view of the interchangeable module of FIG. 22.

Referring to the perspective view of the spring contact 228 shown in FIG. 24, tabs 230 are preferably punched from the top surface 238 and are shown in a compressed or generally co-planar position therewith. As seen in the side view of FIG. 25, spring tabs 230 are bent to be in a free form shape prior to being assembled within inner housing 222. Spring contacts 228 also include tabs 242 (e.g., lances) which are preferably punched from the bottom surface 240. Tabs 242 are pliable and may be bent so as to protrude from bottom surface 240 in order to thereby frictionally engage and make contact with a mating portion of the adapter module as will be described in detail below. It should be noted that the resilient nature of spring contact 228 ensures a snug fit when assembled within the inner housing 222 and the outer housing 220, as seen in the exploded view of FIG. 26.

Referencing FIG. 21 again, once module 54 is assembled, it includes an opening 226 for receiving a mating portion located on the adapter module of the electrical plug assembly. In the preferred embodiment of the invention, opening 226 has an upset cross-sectional T-shape which runs through one side 223 (e.g. open-side wall) of the walls of inner housing 222 to a defined thickness, and then to an opposite side 229 of the inner housing 222. The upset T-shaped opening 226 is configured to receive a symmetrically rigid L-shape casing formed by keyed portions 330 (FIG. 33) described in detail below. The compressing differential of tabs 242 prior to and subsequent to assembly permits a pre-stroke difference, i.e., for enabling matching parts to always be in contact therewith under any conditions, including vibration or shock. Moreover, with this arrangement, it will become apparent to those of ordinary skill in the art that the spring tabs 230 may conform easily to the shape of the end 227 of prong 224 so as to ensure a secure contact therebetween.

Figure 28:
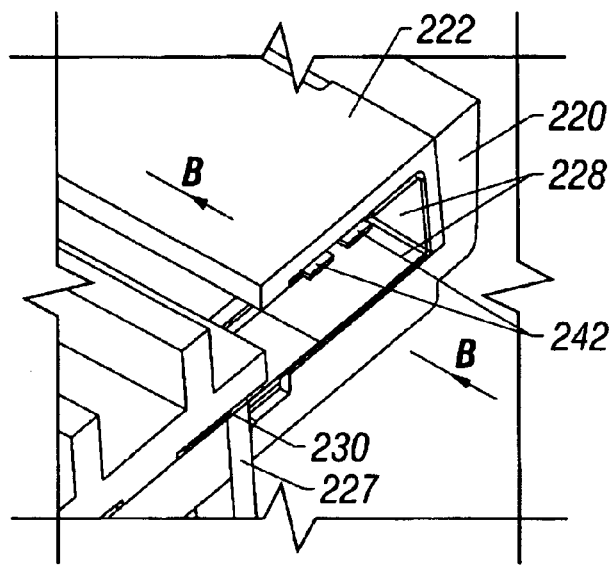
FIG. 28 is a partially cut-away cross-sectional perspective view of the interchangeable module of FIG. 21 taken along line 29—29.
Figure 29:
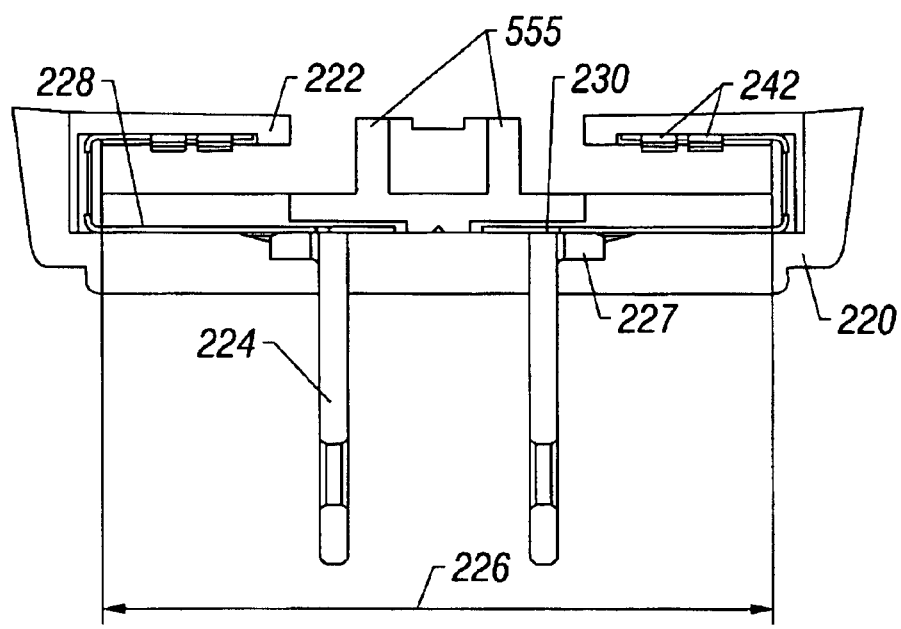
FIG. 29 is a cross-sectional perspective view of the interchangeable module of FIG. 21 shown in FIG. 28 taken along line B—B.

As shown in the partially cut-away cross-sectional perspective view of FIG. 28 and the perspective view of FIG. 29, the tabs 230 are compressed, while the tabs 242 are uncompressed, that is in a free position awaiting matching when the spring contact 228 is assembled in interchangeable module 54. To ensure that both the interchangeable module engages the adapter module with spring-back action so as to be electrically coupled theretogether, the tabs 242 provide the pre-stroke distance for matching with mating conductive portions (e.g., prongs) of the adapter module. As shown in FIG. 29, spring contact 228 and prongs 224 form a hollow cross-section. In FIG. 29, an upset plastic portion 555 is shown which is preferably included to prevent probe objects from contacting electrically conducting elements.

There are a number of ways that the spring contacts 228 may be modified while still providing the function of electrically coupling the prongs thereto and of providing a pre-stroke distance to enable their matching with conductive portions of the adapter module when the adapter module is mated with the interchangeable module. For example, referring back to FIGS. 19 and 20, spring contacts 228 are shown in uncompressed and compressed positions, respectively. It will become readily apparent to those skilled in the art that spring contacts 228 may each be embodied as a spring plate to accommodate the interchangeable modules.

Referring back to FIG. 21, the rear side of inner housing 222 includes symmetrically disposed gaps 225 which facilitate the matching of the interchangeable module to the adapter module. Experiments by the inventors indicate that gaps 225 are preferably fabricated to a sufficient width (e.g., 3 mm) that allow the mating portion of the adapter module to be slidably received therewith, but provides a safety feature in preventing fingers and other objects from passing therethrough to touch components conducting electricity.

Figure 31:
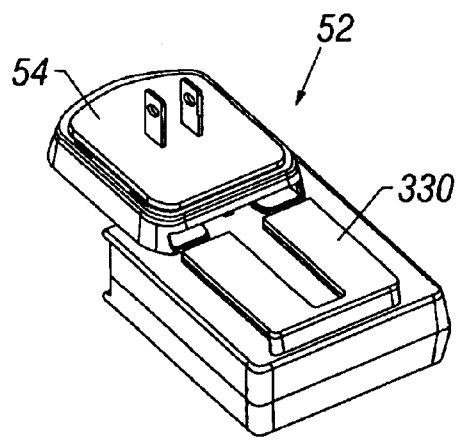
FIG. 31 is a perspective view of the interchangeable module of FIG. 30A with the outer housing slidably engaging the adapter module.
Figure 30A:
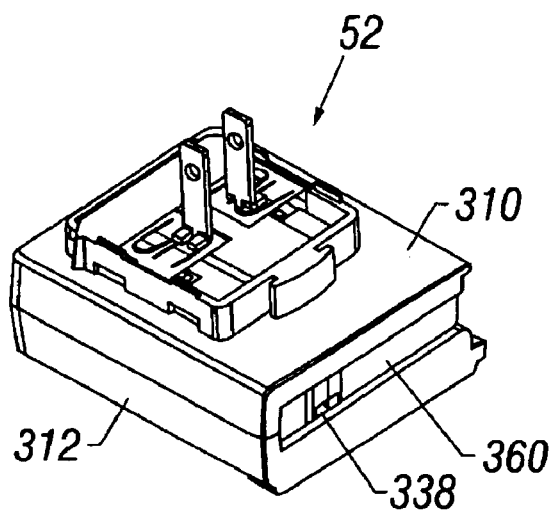
FIG. 30A is a perspective view of the electrical plug assembly of FIG. 4 with the interchangeable module without the outer housing coupled to the adapter module when in an operative position.
Figure 30B:
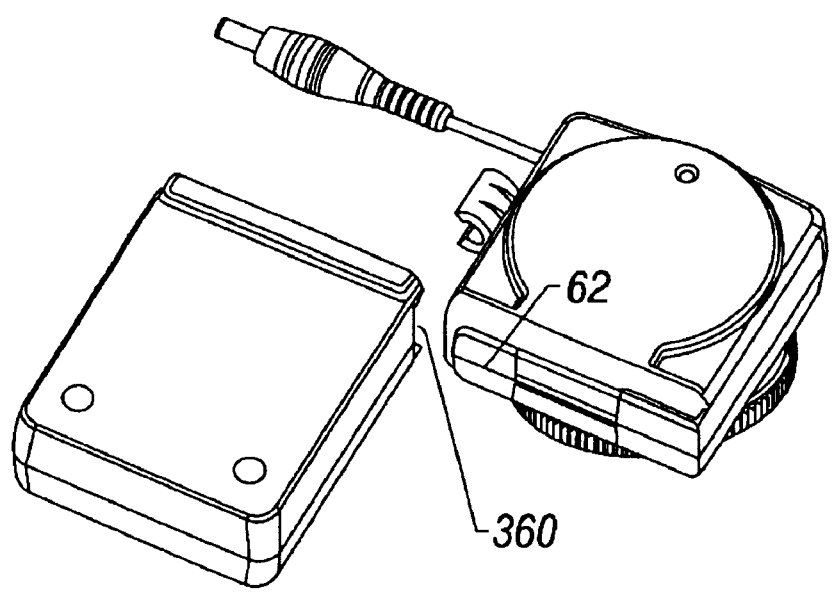
FIG. 30B is a perspective view of an embodiment of the electrical plug assembly of FIG. 4 that includes cooperating means formed along the periphery of the adapter module for enabling electromechanical coupling with a track member disposed along the periphery of the retractable cable assembly.
Figure 32A:
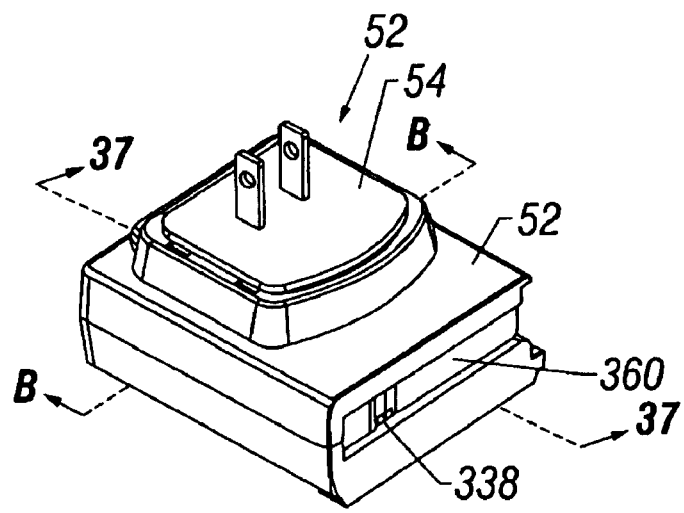
FIG. 32A is a perspective view of the interchangeable module of FIG. 30A with the outer housing coupled to the adapter module when in an operative position.
Figure 32B:
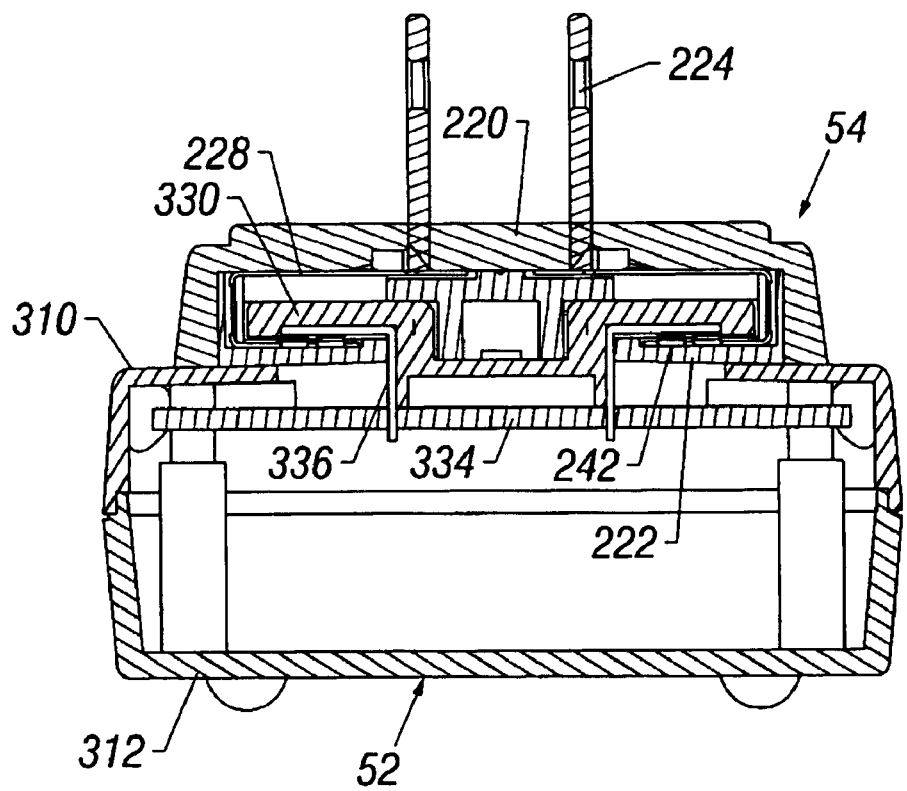
FIG. 32B is a cross-sectional view of the interchangeable module of FIG. 32A taken along line B—B.

FIGS. 30–32 show various perspective views of the interengageable module 54 slidably engaging the adapter module 52, in and out of an operative position. Adapter module 52 preferably includes a top cover 310 which will receive a bottom cover 312 to enclose electrical components supported therewithin. It will be appreciated that the covers 310 and 312 are fabricated from the same nonconductive material that provide electrical and thermal insulation already discussed. Collectively, top cover 310 and bottom cover 312 form a housing for supporting the electrical components therein. Although the adapter module is preferably constructed with two covers, 310 and 312, other embodiments for constructing a housing from a non-conductive material will suffice equivalently (e.g., a single unit housing co-molded about a printed circuit board ("PCB") 334 to be discussed subsequently), so long as consistent with the requirements provided herein. This includes providing cooperating means formed along the periphery of the adapter module for enabling electromechanical coupling with track member 62 disposed along the periphery of the retractable cable assembly, as shown in FIG. 30B. FIG. 32B is a cross-sectional view of the interchangeable module of FIG. 32A taken along line B—B.

Figure 33:
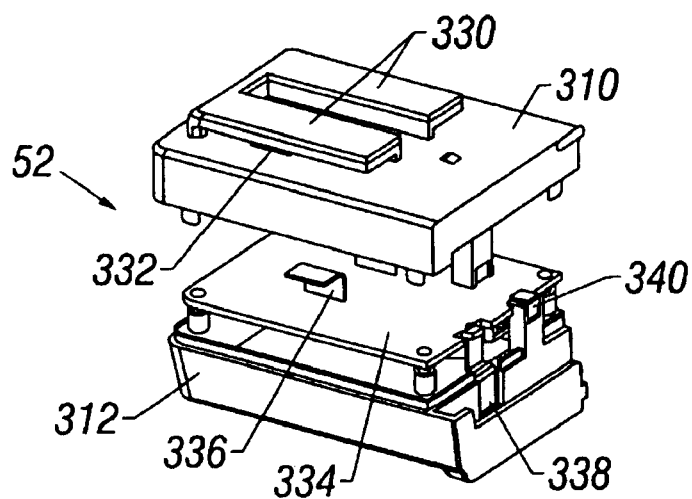
FIG. 33 is a partially-exploded perspective view of the adapter module of FIG. 30A.
Figure 37:
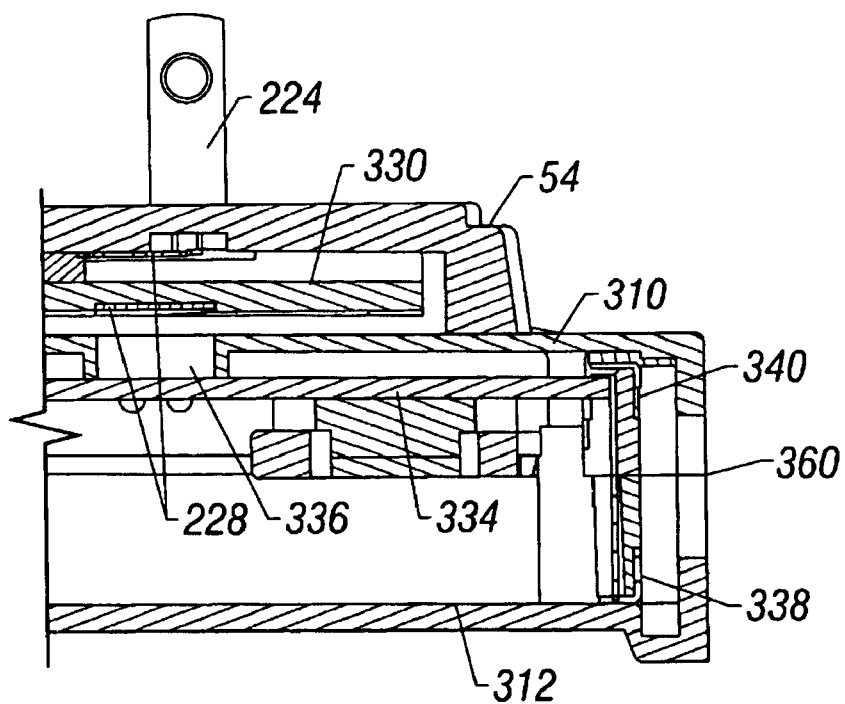
FIG. 37 is a partially cut-away longitudinal cross-sectional view of the adapter module of FIG. 32A taken along line 37—37.
Figure 34:
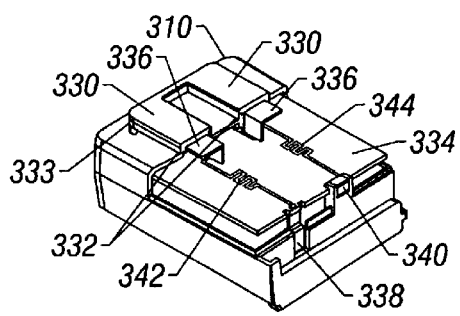
FIG. 34 is a perspective view of the adapter module of FIG. 30A with a partially cutaway view of the top cover.

FIG. 33 shows an exploded perspective view of the adapter module 52. Top cover 310 includes a mating portion extending therefrom to be mated or connected with the interchangeable module 54 described previously. The mating portion comprises keyed portions 330 (e.g., slide) configured to permit openings 332 to extend thereunder and through the top cover 310. Keyed portions 330 are inserted into and mate with opening 226 of the interchangeable module 54 and are designed to maintain alignment and position with respect to the interchangeable module. Keyed portions 330 abut a reinforced wall 333 which also acts as a stopping point when the keyed portions 330 slidably engage the opening 226 of the interchangeable module. The cross-sectional perspective view of top cover 310 in FIG. 34 shows more clearly that keyed portions 330 form a symmetrically rigid L-shape for mating with the opening 226 (shown in FIG. 21) of the interchangeable module. Those skilled in the art will recognize that conventional methods of fabricating keyed portions 330 and opening 226 may be used so long as consistent with the mating of the adapter module to the interchangeable module.

Figure 35:
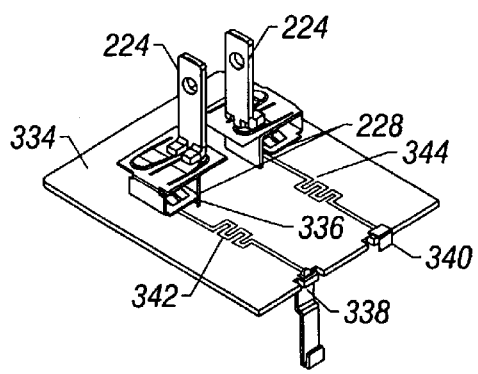
FIG. 35 is a perspective view of the electromechanical components supported within the adapter module and interchangeable module of FIG. 30A when in an operative position.
Figure 36:
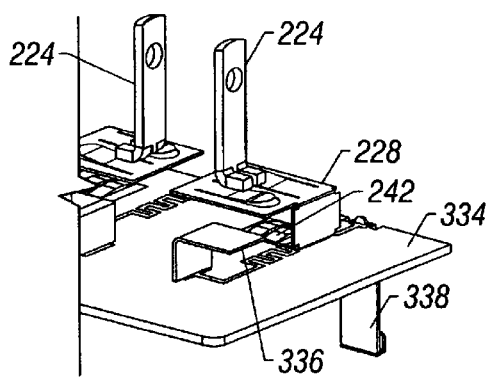
FIG. 36 is a partially cut-away detailed perspective view of the electromechanical components supported within the interchangeable module when slidably engaging the adapter module FIG. 31.
Figure 38:
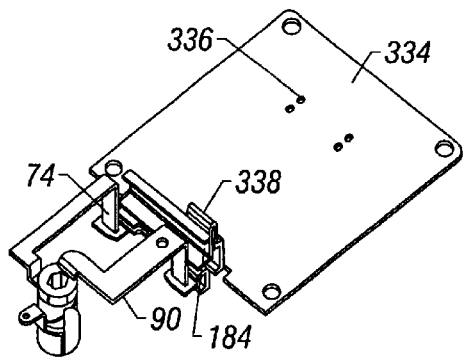
FIG. 38 is a perspective view of the electromechanical components corresponding to the retractable cable assembly coupled to the PCB board of the adapter module according to the preferred embodiment of the invention.
Figure 39:
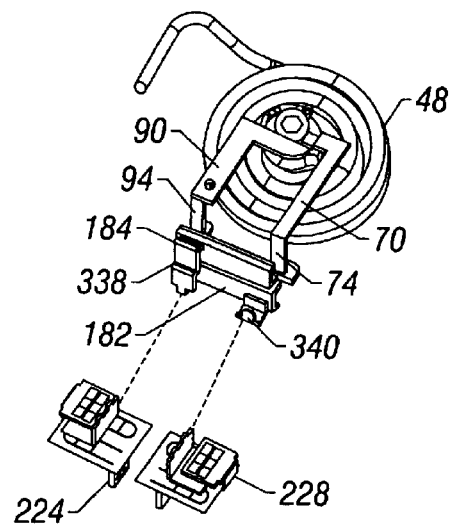
FIG. 39 is a perspective view of the electromechanical components corresponding to the retractable cable assembly coupled to the adapter module and including a cable wound within the retractable cable assembly, and the interengageable portions.

Referring back to FIG. 33, the adapter module 52 includes a PCB 334 supporting a pair of L-shaped bus bars 336 extending therefrom and having a tab surface thereon. It will be appreciated by those of ordinary skill in the art that bus bars 336 may comprise a variety of configurations, in addition to the L-shaped bus bars shown; however, experiments by the inventors have found that when bus bars 336 are configured with a tab, they provide double pole contact areas which effectively match or fit tabs 242, and establishes a good electrical connection therewith. FIG. 36 shows a perspective view of the horizontal movement of the electrical components of interengageable module 54 as it slidably engages the adapter module 52 similar to the view seen in FIG. 31. As seen in FIG. 36, tabs 242 approach the bus bar 336 with this plug-in action to enable electrical coupling of the interchangeable and adapter modules when the tabs 242 match and fit together with the tabs of bus bars 336 (e.g., effectuating double pole contact lances). FIG. 35 illustrates a perspective view showing the final position of this plug-in action, where the spring contacts 228 are electrically coupled to the bus bars 336 of the adapter module. Tabs 242 provide the pre-stroke distance to frictionally engage bus bars 336 thereby enabling a secure mating between the interchangeable module and the adapter module. The L-shaped bus bars 336 are preferably soldered or riveted onto PCB 334 so as to be electrically coupled with the converter circuitry to be described subsequently.

PCB 334 is supported within cover 312 by conventional securing means, here shown in FIG. 33 to be mounted by screws into co-molded column-bores within cover 312. The pair of L-shaped bus bars 336 extend beyond PCB 334 into openings 332 associated with the keyed portions as seen more clearly in FIG. 34, and are supported by walls associated with the keyed portions 330. Bus bars 336 do not extend beyond keyed portions 330 as a safety measure for preventing unwanted contact with objects other than tabs 242. Bus bars 336 are electrically connected via a converter (to be described subsequently in detail) to contact bus bars 338, 340 which are part of the cooperating means formed along the periphery of the adapter module 52 for interengaging track member 62 disposed along the periphery of the retractable cable assembly. Contact bus bars 338, 340 are made of a good conductive and thermal material, and are conventionally known. Upon final assembly of the adapter module, these bus bars 338, 340 remain exposed until they interengage corresponding contacts 184, 182 of the track member 62 when the adapter module 52 is mated with the retractable cable assembly 46 to be in an operative position.

When the interengageable module 54 coupled to the adapter module 52 is plugged into an electrical receptacle outlet (not shown), AC power is drawn from the outlet and received through prongs 224, which are in electrical contact with spring contact 228 and bus bars 336. The AC power is typically a high voltage (e.g., 110/220 VAC) and is referred to herein as the "high voltage." By contrast, the electrical device (e.g., mobile phone, notebook computer or their corresponding chargers) being powered by the electrical adapter of the present invention typically requires a DC voltage of, for example, 5 volts, and is referred to herein as the "low voltage". Accordingly, an AC-to-DC converter is necessary for converting the high voltage to the low voltage.

It will be appreciated by those of ordinary skill in the art that a number of conventional AC-to-DC converters may be utilized to perform this conversion. However, the preferred embodiment of the present invention includes a converter embodied as printed circuit components, e.g. 342, 344, mounted on the PCB 334 by conventionally known methods (e.g., soldered or riveted). As is seen, contact bus bars 338, 340 are electrically coupled to the circuit components 342, 344 and receive the DC voltage to be used by the electrical device coupled to the retractable cable assembly.

Referring back to FIGS. 4–5, the retractable cable assembly 46 is electro-mechanically connectable to the electrical plug assembly 44 via interengageable portions supported by the adapter module and the retractable cable assembly which slidably mate with each other. In this embodiment of the invention, electrical contacts 182 and 184 mate with bus bars 340 and 338, respectively, when the cooperating means interengages the track member 62. As shown in the perspective view of FIG. 30A, the adapter module 52 includes a track 360 defined therein to receive a mating portion, namely track member 62 (shown in FIG. 6), disposed along the retractable cable assembly so as to be slidably engageable therewith. The interengageable portions of the present invention further include means for keeping the adapter module in operative position with the retractable cable assembly, when the track member 62 is inserted into track 360 of the adapter module. This may be provided by conventionally known techniques in which to friction fit and latch the interengageable portions together, so long as this is consistent with international safety standards for the electrical devices discussed herein. As seen in the perspective view of FIG. 38, the electro-mechanical coupling of the components for the retractable cable assembly is shown when the electrical plug assembly is in operative position with the retractable cable assembly. As seen in the perspective view of FIG. 39, cable 48 is electrically coupled to the bus bars 338, 340 to receive the low voltage from the converter circuitry of the adapter module. Cable 48 is in turn coupled to an electrical plug, as shown in FIGS. 4–5, which is coupled to an electrical device (not shown) for supplying the low voltage to operate the device.

Figure 40:
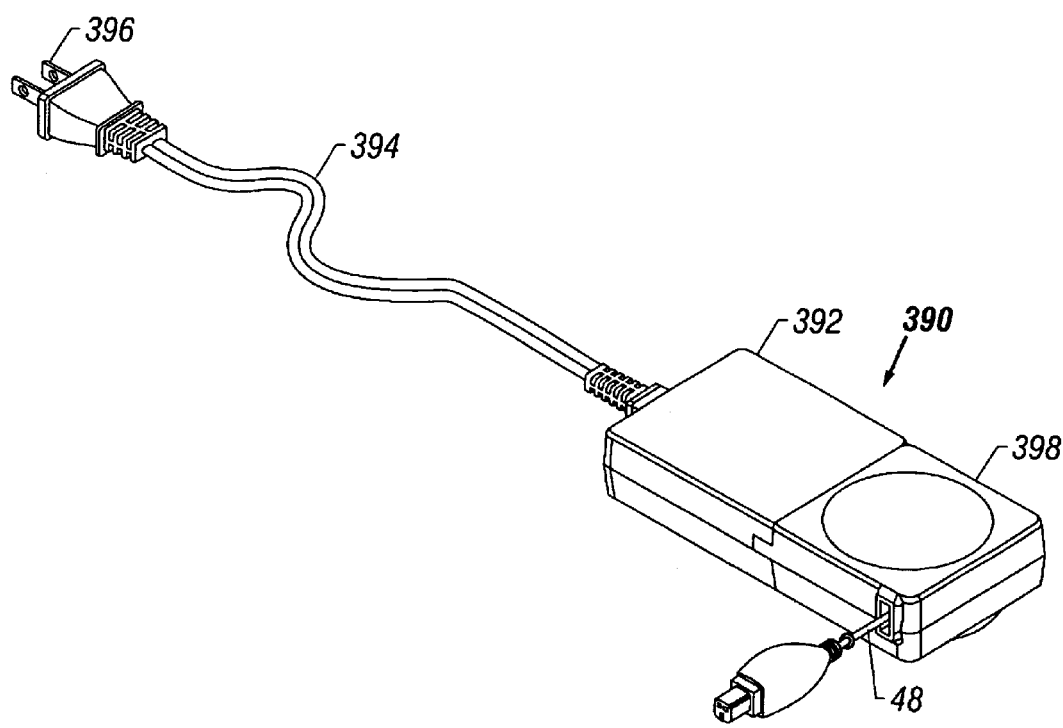
FIG. 40 is a perspective view of another embodiment of the electrical adapter of the present invention having a retractable cable assembly and electrical plug assembly with an input including a conventional AC cable.

FIG. 40 shows a perspective view of an alternate embodiment of the present invention, comprising an electrical adapter 390 with an electrical plug assembly 392 having an input embodied as a conventional AC cord 394 coupled to an electrical plug 396. Plug 396 may be inserted into an electrical receptacle (not shown), as is conventionally known. Electrical adapter 390 further includes a retractable cable assembly 398 similar to that shown in FIG. 4. Electrical plug assembly 392 includes converter circuitry, as previously described herein, but electrically coupled to cable 394. The converter circuitry converts the AC voltage received by cable 394 into a low DC voltage as previously described for use by the electrical device. Electrical plug assembly 392 is coupled to retractable cable assembly 398 as previously described.

Figure 41:
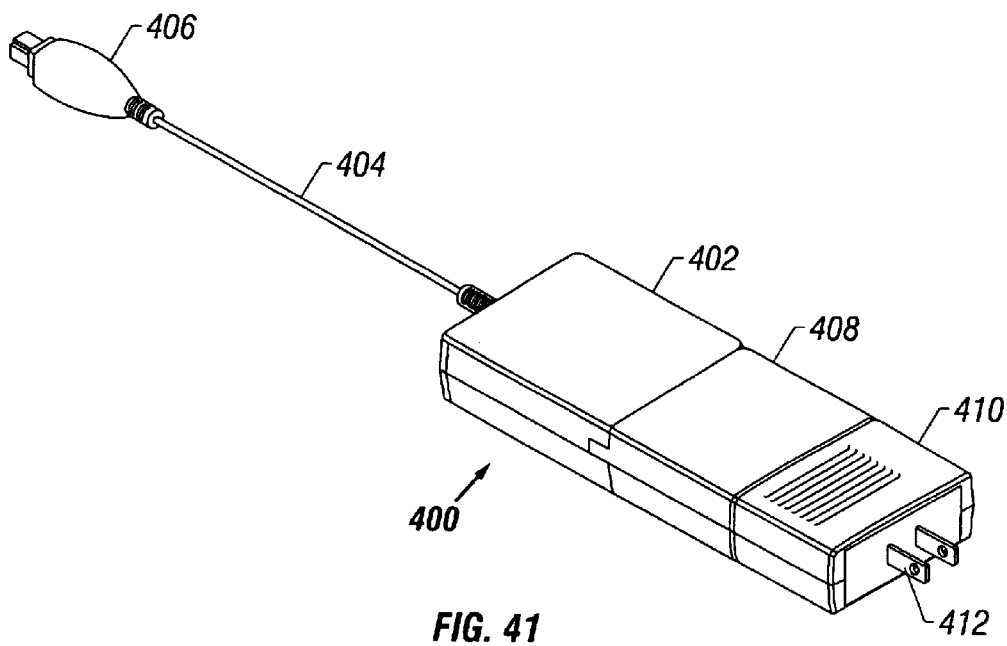
FIG. 41 is a perspective view of another embodiment of the electrical adapter of the present invention having a retractable cable assembly and an electrical plug assembly comprising another retractable cable assembly coupled to a resonant step-down plug in a retracted position.
Figure 42:
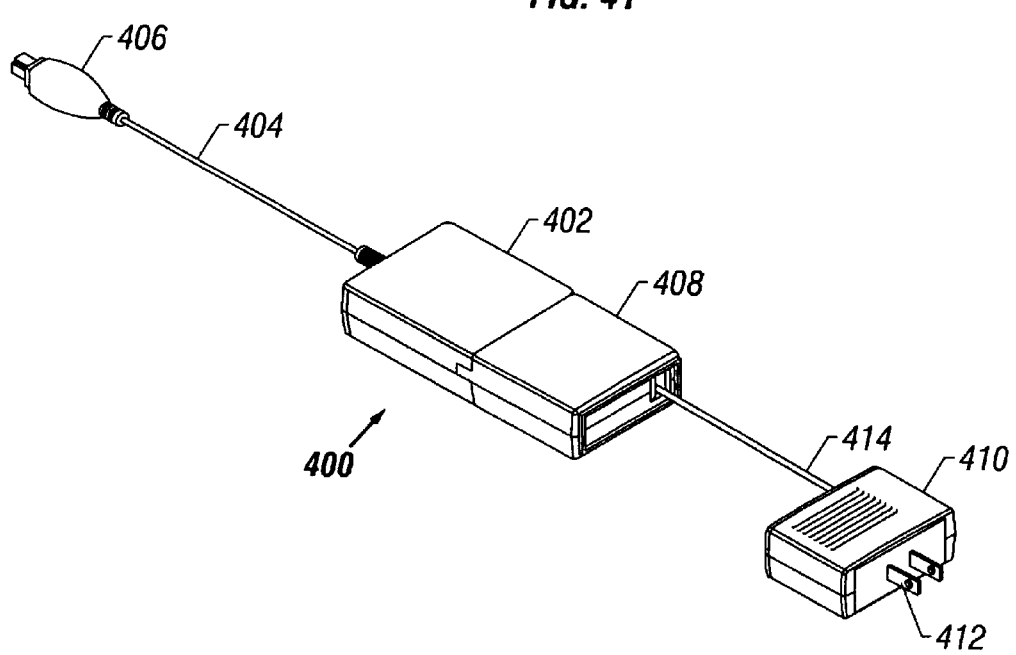
FIG. 42 is a perspective view of the electrical adapter of FIG. 41 with the resonant step-down plug module in an extended position.

Cable 394 generally includes insulation which is often too thick to effectively utilize the retractable cable assembly of the electrical adapter of the present invention. However, in another embodiment of the present invention, the retractable cable assembly may be used within the electrical plug assembly for receiving the high voltage. FIG. 41 shows a perspective view of an electrical adapter 400 having a low voltage assembly 402 and a retractable cable assembly 408. The low voltage assembly 402 includes a low voltage cable 404 coupled to an electric plug 406. Electric plug 406 provides low voltage to an electric device (not shown). The electrical plug assembly is essentially the retractable cable assembly 408 of the present invention coupled to an electrical plug 410 having a AC-DC voltage step-down circuit therein connected to electric plug 412. As shown in the perspective view of FIG. 42, plug 410 is coupled to the retractable cable assembly by a low voltage cable 414. By placing the AC-DC voltage step-down circuit within plug 410, the high voltage received at plug 412 may be semi-regulated and output, preferably as an intermediate voltage, onto a low voltage cable 414. That is, by enclosing a converter in the AC plug to generate a lower isolated voltage, which is then used as the input to a second converter in assembly 408, the immediate voltage is preferably optimized to allow the use of a flexible cable 414 which facilitates the use of a retractable cable assembly. This overcomes the problems of conventional AC power cables being too thick and bulky to be incorporated in the retractable cable assembly because of, respectively, the thick insulation and the heavy copper wire content associated therewith. Because cable 414 requires less insulation and is flexible, it may be stored in a retractable cable assembly 408 discussed above. Within the low voltage assembly 402, conversion circuitry (similar to that of FIG. 35) is preferably included for DC-to-DC conversion functions, i.e., converting the intermediate voltage to a low voltage for output at plug 406.

Figure 43:
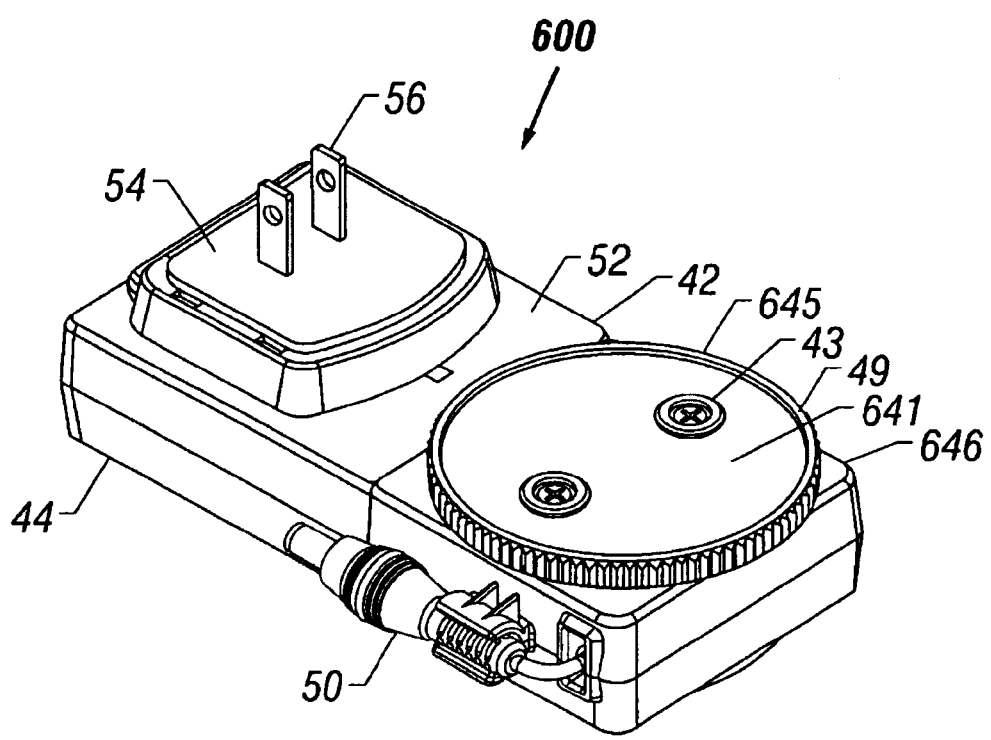
FIG. 43 is a perspective view of another embodiment of the electrical adapter of the present invention having a manually retractable cable assembly and electrical plug assembly with an input including an adapter module coupled to an interchangeable module showing AC power prongs of the type useable in AC power sockets in the United States.

FIG. 43 is a perspective view of another embodiment of the electrical adapter of the present invention having a manually retractable cable assembly 646 and electrical plug assembly 44 with an input including an adapter module 52 coupled to an interchangeable module 54 showing AC power prongs of the type useable in AC power sockets in the United States. In the embodiment in FIG. 43, the electrical plug assembly 44 is as described above. The electrical adapter 600 has a housing 42, an electrical plug assembly 44 that is supported by the housing 42, and includes an input as described above, a converter (not shown, but described above) electrically coupled to the electrical plug assembly, where the input receives a high voltage and the converter converts the high voltage into a low voltage. The electrical adapter includes a retractable cable assembly 646 supported by the housing 642 and electrically coupled to the converter. The retractable cable assembly 646 includes a cable 48 coupled at one end to an electrical plug 50 (e.g., exemplary 6.3 mm diameter) for outputting the low voltage to an electrical device (not shown), such as a portable computer, mobile phone or associated charger, and means for retracting the cable therefrom. Cable assembly 646 has a wheel 645, preferably having a knurled surface on the periphery, as shown in FIG. 43, and an exterior surface 641.

By contrast to the preferred embodiment shown in FIG. 4, the embodiment in FIG. 43 does not include a knob. Wheel 645 includes a grip portion 49 shaped to form a lip disposed along a periphery thereof for manually retracting the cable 48. Grip portion 49 forms an overhang over the retractable cable assembly 646 and includes a shape and texture selected to be grasped by at least a finger of one hand, preferably a thumb, to thereby manually rotate the wheel 645. The retractable cable assembly 646 supports the wheel 645 through the use of screws 43 received in co-molded bores (not shown) disposed and supported therewithin.

In the embodiment in FIG. 43, the electrical plug assembly 44 comprises an adapter module 52 coupled to an interchangeable module 54. The interchangeable module 54 has a plurality of prongs 56, which may be any conventional prongs modified to accommodate a variety of standard electrical wall sockets or outlet receptacles (not shown). The plurality of prongs 56 shown in FIG. 43 is exemplary of a pair of blades conventionally used in the United States.

In summary, the present invention may be used with mobile phones, notebook computers, and their associated chargers. Compared with conventional adapters, the electrical adapter of the present invention has a size reduced substantially by half based upon an inventive arrangement of the cables coupled to electrical contacts disposed about an axis of rotation within a manually retractable cable assembly. Whereas conventional electrical adapters employ output cables which dissipates up to 1.2 Watts, the preferred embodiment of the present invention includes a manually retractable cable assembly for a multi-strand wire with reduced copper content and with soft insulation. The present invention provides these and other benefits stemming from balancing the tradeoffs between the maximum output current, retractable cable assembly size, cable length and overall efficiency.

The foregoing detailed description of the invention has been provided for the purposes of illustration and description. Although exemplary embodiments of the present invention have been described in detail herein with reference to the accompanying drawings, it is to be understood that the invention is not limited to the precise embodiments disclosed, and that various changes and modifications to the present invention are possible in light of the above teaching.

What is claimed is:

1. An electrical adapter, comprising:
    a housing;
    an electrical plug assembly supported by said housing, said assembly including:
        an interchangeable module coupled to an adapter module, said interchangeable module having a plurality of prongs for receiving a first voltage when mated with an electrical receptacle, and
        a converter electrically coupled to said assembly and for converting said first voltage into a second voltage; and
    a retractable cable assembly supported by said housing and electrically coupled to the converter, said retractable cable assembly including
        a cable coupled at one end to an electrical plug for outputting the second voltage,
        a reel for winding and unwinding said cable, said reel being rotatably supported by said housing,
        a wheel for enabling said cable to be manually dispensed from and retracted into said housing,
        a pair of first contacts electrically coupled to each other, one of said first contacts being coupled to another end of the cable, supported by said reel and rotatable about the other of said first contacts,
        a pair of second contacts electrically coupled to each other, one of said second contacts being coupled to said another end of the cable, supported by said reel and rotatable about the other of said second contacts, and
        a pair of terminals electrically coupled respectively to the other of said first contacts and the other of said second contacts for receiving the second voltage from the converter.

2. The electrical adapter of claim 1, wherein said wheel is mounted to said reel.

3. The electrical adapter of claim 2, wherein said wheel includes an exterior surface and a grip portion.

4. The electrical adapter of claim 3, wherein said wheel further includes a rotatable knob supported by said exterior surface.

5. The electrical adapter of claim 4, wherein said grip portion is shaped to form an overhang over said assembly.

6. The electrical adapter of claim 5, wherein said grip portion is shaped to form a lip disposed along a periphery of said exterior surface.

7. The electrical adapter of claim 6, wherein said lip is shaped to form an overhang over said assembly.

8. The electrical adapter of claim 7, wherein said rotatable knob is selected to be grasped by a thumb and index finger of one hand for rotating said wheel.

9. The electrical adapter of claim 8, wherein said grip portion includes a shape and texture selected to be grasped by at least one finger of one hand to thereby rotate the wheel.

10. The electrical adapter of claim 1, wherein said retractable cable assembly further comprises fastening means for providing mechanical support for said wheel in said retractable cable assembly.

11. The electrical adapter of claim 10, wherein said fastening means comprises a plurality of screws.

12. The electrical adapter of claim 1 wherein said interchangeable module comprises an outer housing being adapted for receiving an inner housing, said inner and outer housings being formed from nonconductive materials, and an opening for receiving a mating portion extending from the adapter module.

13. The electrical adapter of claim 12 wherein said mating portion includes an L-shaped casing, and said opening includes a generally T-shaped cross-sectional area for reception of said L-shaped casing.

14. The electrical adapter of claim 12, wherein said plurality of prongs are electrically coupled to spring contacts, said inner housing being adapted to receive and support said spring contacts, said spring contacts being adapted to provide a pre-stroke distance for matching with conductive portions of said adapter module when said opening receives the mating portion.

15. The electrical adapter of claim 14, wherein said plurality of prongs comprises a pair of electrical blade contacts spaced apart and supported by said interchangeable module, said blade contacts for insertion into positive and neutral slots of the receptacle, said slots being connected to opposite poles of a source of electric power.

16. The electrical adapter of claim 14, wherein said plurality of prongs comprises three.

17. The electrical adapter of claim 4 wherein said adapter module comprises a printed circuit board supported by said housing and electro-mechanically coupled to said conductive portions for receiving said first voltage, said converter being disposed on said board for generating the second voltage, and said adapter module further including means for providing said second voltage to said pair of terminals.

18. The electrical adapter of claim 4, further comprising interengageable portions for slidably engaging said adapter module into and out of an operative position with said retractable cable assembly.

19. An electrical adapter of claim 18, wherein said interengageable portions include:
  a track member disposed along a periphery of said retractable cable assembly; and
  cooperating means formed along a periphery of the adapter module, said track member engaging said cooperating means when the adapter module is in the operative position with said retractable cable assembly.

20. An electrical adapter, comprising:
  a housing;
  an electrical plug assembly supported by said housing, said assembly including
    an interchangeable module coupled to an adapter module, said interchangeable module having a plurality of prongs for receiving a first voltage when mated with an electrical receptacle, and
    a converter electrically coupled to said assembly and for converting said first voltage into a second voltage; and
  a retractable cable assembly supported by said housing and electrically coupled to the converter, said retractable cable assembly being releasably attached to said electrical plug assembly, said retractable cable assembly including
    a cable coupled at one end to an electrical plug for outputting the second voltage,
    a reel for winding and unwinding said cable, said reel being rotatably supported by said housing,
    a wheel for enabling said cable to be manually dispensed from and retracted into said housing; said wheel is mounted to said reel; said wheel having an exterior surface, said wheel further comprising:
      a grip portion,
      a rotatable knob supported by said exterior surface, wherein said retractable cable assembly further comprises a plurality of screws for providing mechanical support for said wheel in said housing,
    a pair of first contacts electrically coupled to each other, one of said first contacts being coupled to another end of the cable, supported by said reel and rotatable about the other of said first contacts,
    a pair of second contacts electrically coupled to each other, one of said second contacts being coupled to said another end of the cable, supported by said reel and rotatable about the other of said second contacts, and
    a pair of terminals electrically coupled respectively to the other of said first contacts and the other of said second contacts for receiving the second voltage from the converter.

* * * * *